United States Patent
Kim et al.

(10) Patent No.: US 9,516,635 B2
(45) Date of Patent: *Dec. 6, 2016

(54) APPARATUS AND METHOD FOR TRANSMITTING AND RECEIVING FAST FEEDBACK INFORMATION IN BROADBAND WIRELESS COMMUNICATION SYSTEM

(71) Applicant: Samsung Electronics Co., Ltd., Suwon-si, Gyeonggi-do (KR)

(72) Inventors: Sang-Heon Kim, Suwon-si (KR); Hwa-Sun You, Suwon-si (KR); Hee-Won Kang, Seongnam-si (KR); Jae-Hee Cho, Seoul (KR); Si-Hyun Park, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 102 days.

This patent is subject to a terminal disclaimer.

(21) Appl. No.: 14/299,613

(22) Filed: Jun. 9, 2014

(65) Prior Publication Data

US 2014/0286271 A1  Sep. 25, 2014

Related U.S. Application Data

(63) Continuation of application No. 12/545,317, filed on Aug. 21, 2009, now Pat. No. 8,750,277.

(30) Foreign Application Priority Data

Aug. 29, 2008 (KR) .......................... 10-2008-0084922
Jul. 6, 2009 (KR) .......................... 10-2009-0061261

(51) Int. Cl.
*H04W 72/04* (2009.01)
*H04L 27/12* (2006.01)
(Continued)

(52) U.S. Cl.
CPC ............ *H04W 72/042* (2013.01); *H04L 27/12* (2013.01); *H04W 28/0252* (2013.01); *H04W 28/06* (2013.01)

(58) Field of Classification Search
CPC  H04B 7/0417; H04B 7/0478; H04B 7/0619; H04B 7/0636; H04L 25/03949; H04W 28/0252; H04W 28/06; H04W 72/042
See application file for complete search history.

(56) References Cited

U.S. PATENT DOCUMENTS 7,499,430 B2   3/2009  Yun et al.
7,630,356 B2   12/2009 Zhang et al.
(Continued)

FOREIGN PATENT DOCUMENTS

CN   1808962 A   7/2006
CN   1961555 A   5/2007
(Continued)

OTHER PUBLICATIONS

J Lim et al., 'Link Adaptation for IEEE 802.16m', IEEE C802.16m-081676, IEEE, Jul. 7, 2008, p. 5, internet <URL : http://grouper.ieee.org/groups/802/16/tgm/contrib/C80216m-08_676.pdf>.

*Primary Examiner* — Benjamin H Elliott, IV
(74) *Attorney, Agent, or Firm* — Jefferson IP Law, LLP

(57) ABSTRACT

An apparatus and method for operating a fast feedback channel in a broadband wireless communication system are provided. The method includes generating and transmitting a feedback signal through a fast feedback channel of a first mode, determining to switch a mode of the fast feedback channel from the first mode to a second mode, transmitting a signal for requesting the mode switching of the fast feedback channel through the fast feedback channel, and generating and transmitting a feedback signal through a fast feedback channel of the second mode.

28 Claims, 21 Drawing Sheets

(51) Int. Cl.
*H04W 28/02* (2009.01)
*H04W 28/06* (2009.01)

(56) References Cited

U.S. PATENT DOCUMENTS

| | | |
|---|---|---|
| 2005/0265227 A1 | 12/2005 | Byun et al. |
| 2005/0276317 A1 | 12/2005 | Jeong et al. |
| 2006/0013185 A1 | 1/2006 | Seo et al. |
| 2006/0079221 A1 | 4/2006 | Grant et al. |
| 2006/0094435 A1 | 5/2006 | Thomas et al. |
| 2007/0070967 A1 | 3/2007 | Yang et al. |
| 2007/0115796 A1 | 5/2007 | Jeong et al. |
| 2007/0274253 A1 | 11/2007 | Zhang et al. |
| 2008/0119213 A1 | 5/2008 | Ihm et al. |
| 2008/0268860 A1 | 10/2008 | Lunttila et al. |
| 2009/0225890 A1 | 9/2009 | Jin et al. |
| 2010/0056067 A1 | 3/2010 | Kim et al. |
| 2010/0284359 A1 | 11/2010 | Kim et al. |

FOREIGN PATENT DOCUMENTS

| | | |
|---|---|---|
| CN | 101040461 A | 9/2007 |
| CN | 101133608 A | 8/2008 |
| JP | 2007-068180 A | 3/2007 |
| JP | 2007-097173 A | 4/2007 |
| JP | 2008-500763 A | 1/2008 |
| JP | 2008-519566 A | 6/2008 |
| KR | 10-2006-0082016 A | 7/2006 |
| RU | 2 271 072 C1 | 2/2006 |
| WO | 2006-004355 A | 1/2006 |

I : INFORMATION SYMBOL    P : PILOT SYMBOL

APPARATUS AND METHOD FOR TRANSMITTING AND RECEIVING FAST FEEDBACK INFORMATION IN BROADBAND WIRELESS COMMUNICATION SYSTEM

PRIORITY

This application is a continuation application of a prior application Ser. No. 12/545,317, filed on Aug. 21, 2009, which claimed the benefit under 35 U.S.C. §119(a) of a Korean patent application filed on Aug. 29, 2008 in the Korean Intellectual Property Office and assigned Serial number 10-2008-0084922 and a Korean patent application filed on Jul. 6, 2009 in the Korean Intellectual Property Office and assigned Serial number 10-2009-0061261, the entire disclosure of each of which is hereby incorporated by reference.

BACKGROUND OF THE INVENTION

1. Field of the Invention

The present invention relates to a broadband wireless communication system. More particularly, the present invention relates to an apparatus and method for transmitting and receiving information through a fast feedback channel in a broadband wireless communication system.

2. Description of the Related Art

In the next generation communication system, also known as the $4^{th}$ Generation (4G) communication system, research is being actively conducted to provide a Quality of Service (QoS) with a data transfer speed of about 100 Mbps. An example of such a communication system is an Institute of Electrical and Electronics Engineers (IEEE) 802.16 system. The IEEE 802.16 system employs an Orthogonal Frequency Division Multiplexing (OFDM)/Orthogonal Frequency Division Multiple Access (OFDMA) scheme so that a broadband network can be supported in a physical channel.

In a broadband wireless communication system such as the IEEE 802.16 system, Mobile Stations (MSs) located within a cell periodically transmit feedback information to a Base Station (BS). The feedback information can represent a forward channel state through additional physical channels allocated along frequency and time axes. Examples of the feedback information include Channel Quality Indication (CQI) information such as a Carrier to Interference and Noise Ratio (CINR) and a Modulation and Coding Scheme (MCS), sub-band information having an excellent channel property, and a Precoding Matrix Index (PMI) of Multiple Input Multiple Output (MIMO). The feedback information may only be a small amount of information but is significantly important in the operation of the communication system and thus requires high reliability to support the entire cell area including a cell edge. Alternatively, the feedback information may be information having a large amount of information to support a MIMO mode operated in a high Signal to Noise Ratio (SNR) environment.

A fast feedback channel supporting the entire cell area has to be designed to have a robust structure so that a region of a low SNR can also be supported with a small amount of information. Therefore, in a communication system such as the IEEE 802.16 system, a noncoherent modulation/demodulation scheme is used for the fast feedback channel. That is, a transmitting end assigns a code sequence, corresponding to information to be transmitted, to an allocated resource and then transmits the resultant code sequence, and a receiving end searches for a code sequence corresponding to a maximum value among correlation values between each of all code sequences and a received signal.

With the recent development of multimedia technologies and the increase in demands thereof, a high data rate is necessary and thus a recently developed communication system actively adopts an improved technique such as MIMO for the support of the high data rate. Unlike in a conventional communication system which uses a level of CQI information as feedback information, a technique such as Closed-Loop (CL)-MIMO requires a relatively large amount of feedback information, e.g., a PMI, a rank, etc. However, an amount of feedback information transmittable through the fast feedback channel is limited by a length of the code sequence. If to-be-transmitted feedback information has a length greater than or equal to the code sequence, a plurality of fast feedback channels has to be allocated to a single MS.

As described above, since a large amount of feedback information is required, a currently available method for operating the fast feedback channel is not suitable to effectively transmit a required amount of information. Therefore, there is a need for a method for effectively operating a fast feedback channel with a limited amount of resources in a broadband wireless communication system in which a variety of feedback information exists.

SUMMARY OF THE INVENTION

An aspect of the present invention is to address at least the above-mentioned problems and/or disadvantages and to provide at least the advantages described below. Accordingly, an aspect of the present invention is to provide an apparatus and method for effectively operating a fast feedback channel with a limited amount of resources in a broadband wireless communication system.

Another aspect of the present invention is to provide an apparatus and method for selectively applying a noncoherent modulation/demodulation scheme and a coherent modulation/demodulation scheme to a fast feedback channel in a broadband wireless communication system.

Yet another aspect of the present invention is to provide an apparatus and method for requesting the mode switching of a fast feedback channel in a broadband wireless communication system.

Still another aspect of the present invention is to provide an apparatus and method for determining a mode of a fast feedback channel according to a type of feedback information in a broadband wireless communication system.

In accordance with an aspect of the present invention, a method for operating a Mobile Station (MS) in a broadband wireless communication system using a fast feedback channel supporting at least two modes is provided. The method includes generating and transmitting a feedback signal through a fast feedback channel of a first mode, determining to switch a mode of the fast feedback channel from the first mode to a second mode, transmitting a signal for requesting the mode switching of the fast feedback channel through the fast feedback channel, and generating and transmitting a feedback signal through a fast feedback channel of the second mode.

In accordance with another aspect of the present invention, a method for operating a Base Station (BS) in a broadband wireless communication system using a fast feedback channel supporting at least two modes is provided. The method includes detecting feedback information from a feedback signal received through the fast feedback channel according to a first mode, receiving a signal for requesting the mode switching from the first mode to a second mode through the fast feedback channel, and detecting the feedback information from the feedback signal received through the fast feedback channel according to the second mode.

In accordance with yet another aspect of the present invention, a Mobile Station (MS) apparatus in a broadband wireless communication system using a fast feedback channel supporting at least two modes is provided. The apparatus includes a first configuration unit for generating a feedback signal to be transmitted through a fast feedback channel of a first mode, a second configuration unit for generating a feedback signal to be transmitted through a fast feedback channel of a second mode, a transmitter for transmitting the feedback signal, and a determination unit for controlling feedback signal generation operations of the first and second configuration units according to a mode of the fast feedback channel, and if it is determined that the fast feedback channel changes its mode from the first mode to the second mode, for providing control such that a signal for mode switching of the fast feedback channel is transmitted through the fast feedback channel and for determining switching to the second mode.

In accordance with still another aspect of the present invention, a Base Station (BS) apparatus in a broadband wireless communication system using a fast feedback channel supporting at least two modes is provided. The apparatus includes a first detector for detecting feedback information from a feedback signal received through the fast feedback channel according to a first mode, a second detector for detecting feedback information from a feedback signal received through the fast feedback channel according to a second mode, and a manager for controlling operations of the first and second detectors according to a mode of the feedback channel, and if a signal for requesting the mode switching from the first mode to the second mode is detected through the fast feedback channel, for stopping the detection operation of the first detector and for controlling the second detector to detect feedback information according to the second mode.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Hereinafter, a technique for effectively operating a fast feedback channel with a limited amount of resources in a broadband wireless communication system will be described. Although an Orthogonal Frequency Division Multiplexing (OFDM)/Orthogonal Frequency Division Multiple Access (OFDMA)-based wireless communication system is described hereinafter for example, the present invention can also equally apply to other types of wireless communication system.

Figure 1:
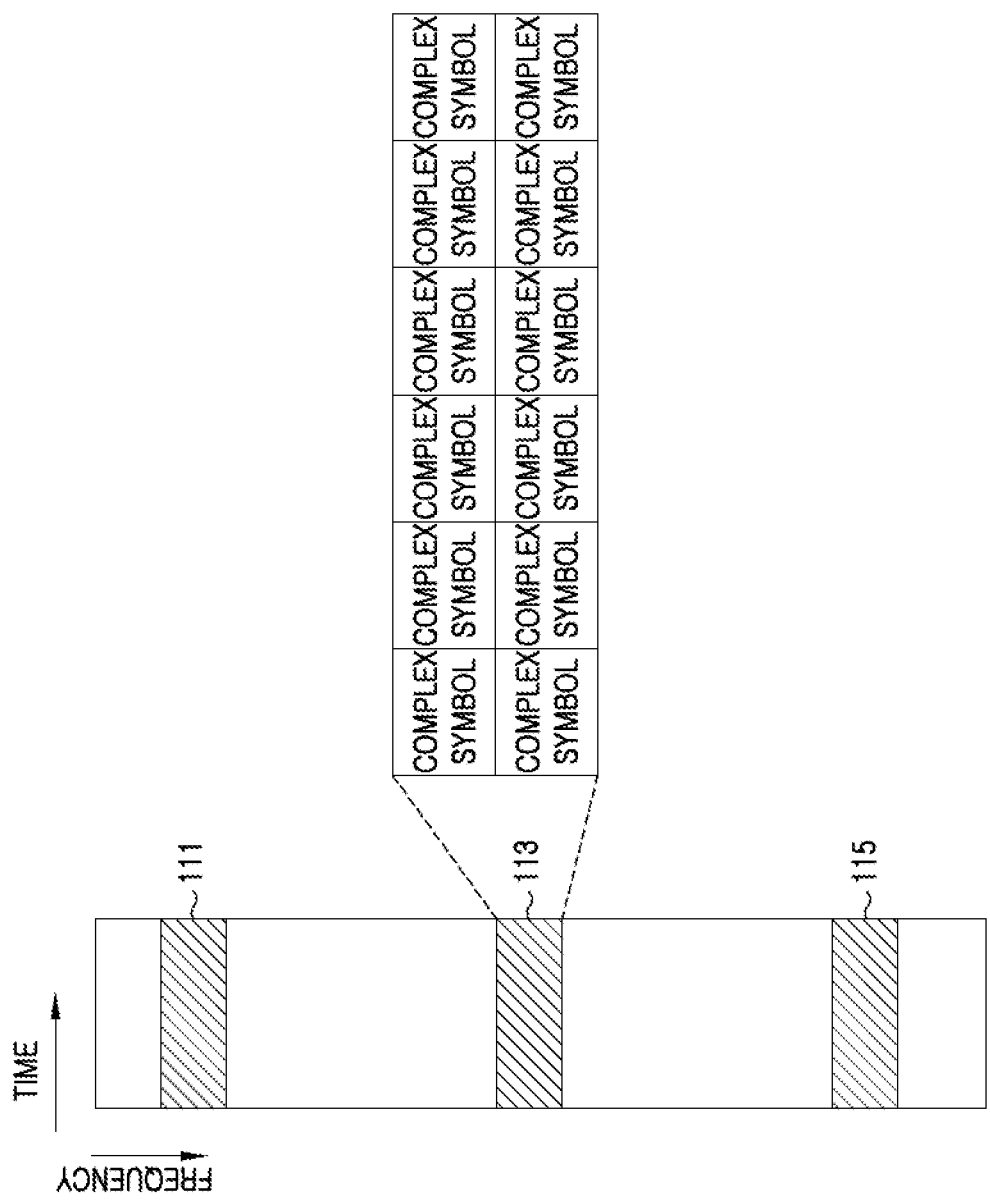
FIG. 1 illustrates a structure of a fast feedback channel in a broadband wireless communication system according to an exemplary embodiment of the present invention.

FIG. 1 illustrates a structure of a fast feedback channel in a broadband wireless communication system according to an exemplary embodiment of the present invention.

Referring to FIG. 1, a fast feedback channel having a structure of FIG. 1 is assumed in an exemplary embodiment of the present invention. That is, the fast feedback channel consists of three sub-carrier bundles 111, 113, and 115, and each sub-carrier bundle includes two sub-carriers and 6 OFDM symbols. That is, one sub-carrier bundle includes 12 modulation symbols. However, an exemplary embodiment of the present invention may also equally apply to wireless communication systems using other types of fast feedback channels.

Figure 2:
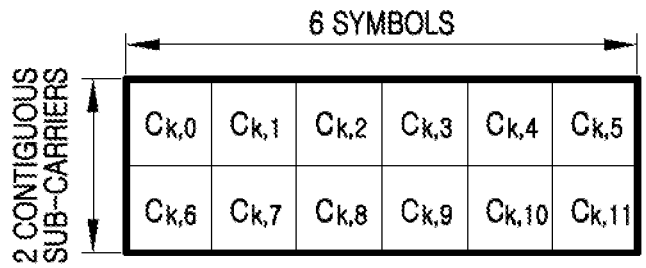
FIG. 2 illustrates a structure of a Basic Feedback Channel (BFCH) in a broadband wireless communication system according to an exemplary embodiment of the present invention.
Figure 3:
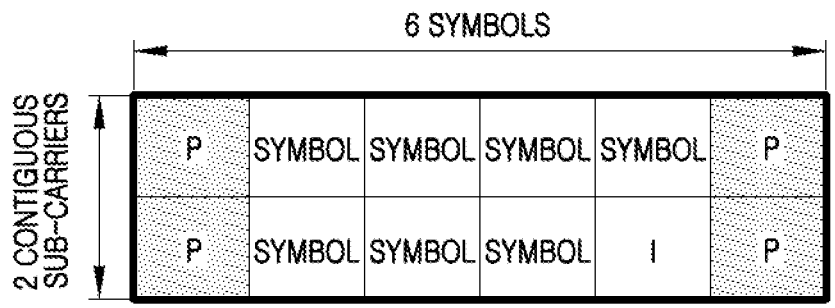
FIG. 3 illustrates a structure of an Enhanced Feedback Channel (EFCH) in a broadband wireless communication system according to an exemplary embodiment of the present invention.

In order to effectively operate a fast feedback channel with a limited amount of resources, a broadband wireless communication system according to an exemplary embodiment of the present invention selectively uses two types of fast feedback channels as illustrated in FIG. 2 and FIG. 3. For convenience of explanation, the fast feedback channel of FIG. 2 is referred to as a Basic Feedback Channel (BFCH), and the fast feedback channel of FIG. 3 is referred to as an Enhanced Feedback Channel (EFCH). According to an exemplary embodiment of the present invention, the BFCH and the EFCH use a tile consisting of 2 contiguous sub-carriers and 6 OFDM symbols as a basic structure and the basic structure of the tile can be modified in any frequency and time according to an exemplary embodiment of the present invention.

FIG. 2 illustrates a structure of a Basic Feedback Channel (BFCH) in a broadband wireless communication system according to an exemplary embodiment of the present invention.

Referring to FIG. 2, the BFCH is a fast feedback channel which uses a noncoherent modulation/demodulation scheme. A code sequence Ck with a length of 12 is transmitted through the BFCH. That is, in the BFCH, elements $C_{k,0}$ to $C_{k,11}$ of the code sequence Ck are assigned to respective tones within a tile, and may be redundantly assigned to a plurality of tiles to obtain a diversity gain.

FIG. 3 illustrates a structure of an Enhanced Feedback Channel (EFCH) in a broadband wireless communication system according to an exemplary embodiment of the present invention.

Referring to FIG. 3, the EFCH is a fast feedback channel which uses a coherent modulation/demodulation scheme, and includes a pilot symbol. 4 pilot symbols and 8 feedback information symbols are transmitted through the EFCH. That is, in the EFCH, pilot symbols are allocated to some tones for coherent demodulation. Channel-coded and modulated feedback information symbols are allocated to tones other than the tones to which the pilot symbols are allocated. Herein, the number of pilot symbols and the positions thereof may change variously according to an exemplary implementation.

If the fast feedback channel consists of 3 tiles as illustrated in FIG. 1, an amount of information transmissible through the EFCH is 24 bits when using channel coding with a 1/2 coding rate and is 16 bits when using channel coding with a 1/3 coding rate. The amount of information transmissible through the EFCH is greater than an amount of information transmissible through the BFCH. Further, the amount of information transmissible through the EFCH can be regulated by differently setting the number of pilot symbols and the coding rate.

In the broadband wireless communication system according to an exemplary embodiment of the present invention, the fast feedback channel is the BFCH by default, and switches to the EFCH when an amount of feedback information increases. Of course, the fast feedback channel may also switch from the EFCH to the BFCH when the amount of feedback information decreases.

The BFCH used in the broadband wireless communication system according to an exemplary embodiment of the present invention is a basic feedback channel that may support an entire cell area used for the purpose of Channel Quality Indicator (CQI) information transmission. That is, the BFCH is basically allocated to a Mobile Station (MS) when communication is made between a Base Station (BS) and the MS, and the MS persistently feeds back CQI information according to a period assigned by the BS. For example, code sequences for the BFCH have an information amount of 6 bits as shown in Table 1 below, and use 5 bits to represent the CQI information.

TABLE 1

| Fast feedback payload | Code sequence | Notes |
|---|---|---|
| 0b000000 | C0 | Indicate CQI |
| 0b000001 | C1 | (5 LSB bits) |
| 0b000010 | C2 | |
| 0b000011 | C3 | |
| 0b000100 | C4 | |
| 0b000101 | C5 | |
| 0b000110 | C6 | |
| . | . | |
| . | . | |
| . | . | |
| 0b011110 | C30 | |
| 0b011111 | C31 | |
| 0b100000 | C32 | Extra usages |
| . | . | |
| . | . | |
| . | . | |
| 0b111101 | C61 | |
| 0b111110 | C62 | E1 (switch to EFCH from BFCH) |
| 0b111111 | C63 | E2 (switch to BFCH from EFCH) |

Referring to Table 1 above, code sequences $C_0$ to $C_{31}$ are used to indicate CQI, and code sequences $C_{32}$ to $C_{62}$ are used for extra usages. A code sequence $C_{62}$ may be used for a request of switching from a BFCH mode to an EFCH mode. A code sequence $C_{63}$ may be used for a request of switching from the EFCH mode to the BFCH mode. Examples of the extra usages include a bandwidth request, a preferred Multiple Input Multiple Output (MIMO) mode, frequency partition selection, etc.

Mode switching of the feedback channel is determined according to changes in a type of feedback information. The type of feedback information is determined according to an operation mode of the MS. Consequently, a mode of the feedback channel is determined by the operation mode of the MS. Although code sequences dedicatedly allocated for mode switching, e.g., an E1 code and an E2 code, can be used to request mode switching as described above, according to another exemplary embodiment of the present invention, code sequences for reporting the preferred MIMO mode among the code sequences allocated for the extra usages can be used as code sequences for requesting the mode switching. In this case, possible modes of the feedback channel may be three or more types of modes including a plurality of EFCH modes and BFCH modes rather than two types of modes, i.e., the EFCH mode and the BFCH mode.

When using the fast feedback channel as illustrated in FIG. 1, the number of tones constituting a code sequence is 12. That is, a length of the code sequence is 12. When considering the code sequence with a length of 12, the 64 code sequences of Table 1 above are not generated if an orthogonal code sequence set is constructed. Therefore, to transmit and receive the 64 code sequences through the fast feedback channel of FIG. 1, an exemplary embodiment of the present invention may use a quasi-orthogonal code sequence set. In other words, the broadband wireless communication system uses 64 quasi-orthogonal code sequences by combining different phase vectors with a code sequence consisting of the same combination while using code sequences constructed of all possible combinations of different orthogonal sub-code sequences. For example, when 4 orthogonal sub-code sequences exist, 16 combinations are possible in total, and 64 quasi-orthogonal code sequences are generated by applying 4 phase vectors to each of the 16 combinations. Table 2 below shows an example of a quasi-orthogonal code sequence set generated according to the aforementioned method.

TABLE 2

| codeword | index of sub-signal stream (l, m, n) | phase difference vector (BPSK) | signal stream (BPSK) |
|---|---|---|---|
| 0b000000 | (0, 0, 0) | (1, 1, 1) | 111111111111 |
| 0b000001 | (0, 0, 0) | (1, −1, 1) | 111100001111 |
| 0b000010 | (0, 0, 0) | (1, 1, −1) | 111111110000 |
| 0b000011 | (0, 0, 0) | (1, −1, −1) | 111100000000 |
| 0b000100 | (0, 1, 2) | (1, 1, 1) | 111111001001 |
| 0b000101 | (0, 1, 2) | (1, −1, 1) | 111100111001 |
| 0b000110 | (0, 1, 2) | (1, 1, −1) | 111111000110 |
| 0b000111 | (0, 1, 2) | (1, −1, −1) | 111100110110 |
| 0b001000 | (0, 2, 3) | (1, 1, 1) | 111100111010 |
| 0b001001 | (0, 2, 3) | (1, −1, 1) | 111101101010 |
| 0b001010 | (0, 2, 3) | (1, 1, −1) | 111110010101 |
| 0b001011 | (0, 2, 3) | (1, −1, −1) | 111101100101 |
| 0b001100 | (0, 3, 1) | (1, 1, 1) | 111110101100 |
| 0b001101 | (0, 3, 1) | (1, −1, 1) | 111101011100 |
| 0b001110 | (0, 3, 1) | (1, 1, −1) | 111110100011 |
| 0b001111 | (0, 3, 1) | (1, −1, −1) | 111101010011 |
| 0b010000 | (1, 2, 0) | (1, 1, 1) | 110010011111 |
| 0b010001 | (1, 2, 0) | (1, −1, 1) | 110001101111 |
| 0b010010 | (1, 2, 0) | (1, 1, −1) | 110010010000 |
| 0b010011 | (1, 2, 0) | (1, −1, −1) | 110001100000 |
| 0b010100 | (2, 3, 0) | (1, 1, 1) | 100110101111 |
| 0b010101 | (2, 3, 0) | (1, −1, 1) | 100101011111 |
| 0b010110 | (2, 3, 0) | (1, 1, −1) | 100110100000 |
| 0b010111 | (2, 3, 0) | (1, −1, −1) | 100101010000 |
| 0b011000 | (3, 1, 0) | (1, 1, 1) | 101011001111 |
| 0b011001 | (3, 1, 0) | (1, −1, 1) | 101000111111 |
| 0b011010 | (3, 1, 0) | (1, 1, −1) | 101011000000 |
| 0b011011 | (3, 1, 0) | (1, −1, −1) | 101000110000 |
| 0b011100 | (2, 0, 1) | (1, 1, 1) | 100111111100 |
| 0b011101 | (2, 0, 1) | (1, −1, 1) | 100100001100 |
| 0b011110 | (2, 0, 1) | (1, 1, −1) | 100111110011 |
| 0b011111 | (2, 0, 1) | (1, −1, −1) | 100100000011 |
| 0b100000 | (3, 0, 2) | (1, 1, 1) | 101011111001 |
| 0b100001 | (3, 0, 2) | (1, −1, 1) | 101000001001 |
| 0b100010 | (3, 0, 2) | (1, 1, −1) | 101011110110 |
| 0b100011 | (3, 0, 2) | (1, −1, −1) | 101000000110 |
| 0b100100 | (1, 0, 3) | (1, 1, 1) | 110011111010 |
| 0b100101 | (1, 0, 3) | (1, −1, 1) | 110000001010 |
| 0b100110 | (1, 0, 3) | (1, 1, −1) | 110011110101 |
| 0b100111 | (1, 0, 3) | (1, −1, −1) | 110000000101 |
| 0b101000 | (1, 3, 2) | (1, 1, 1) | 110010101001 |
| 0b101001 | (1, 3, 2) | (1, −1, 1) | 110001011001 |

TABLE 2-continued

| codeword | index of sub-signal stream (l, m, n) | phase difference vector (BPSK) | signal stream (BPSK) |
|---|---|---|---|
| 0b101010 | (1, 3, 2) | (1, 1, −1) | 110010100110 |
| 0b101011 | (1, 3, 2) | (1, −1, −1) | 110001010110 |
| 0b101100 | (2, 1, 3) | (1, 1, 1) | 100111001010 |
| 0b101101 | (2, 1, 3) | (1, −1, 1) | 100100111010 |
| 0b101110 | (2, 1, 3) | (1, 1, −1) | 100111000101 |
| 0b101111 | (2, 1, 3) | (1, −1, −1) | 100100110101 |
| 0b110000 | (3, 2, 1) | (1, 1, 1) | 101010011100 |
| 0b110001 | (3, 2, 1) | (1, −1, 1) | 101001101100 |
| 0b110010 | (3, 2, 1) | (1, 1, −1) | 101010010011 |
| 0b110011 | (3, 2, 1) | (1, −1, −1) | 101001100011 |
| 0b110100 | (1, 1, 1) | (1, 1, 1) | 110011001100 |
| 0b110101 | (1, 1, 1) | (1, −1, 1) | 110000111100 |
| 0b110110 | (1, 1, 1) | (1, 1, −1) | 110011000011 |
| 0b110111 | (1, 1, 1) | (1, −1, −1) | 110000110011 |
| 0b111000 | (2, 2, 2) | (1, 1, 1) | 100110011001 |
| 0b111001 | (2, 2, 2) | (1, −1, 1) | 100101101001 |
| 0b111010 | (2, 2, 2) | (1, 1, −1) | 100110010110 |
| 0b111011 | (2, 2, 2) | (1, −1, −1) | 100101100110 |
| 0b111100 | (3, 3, 3) | (1, 1, 1) | 101010101010 |
| 0b111101 | (3, 3, 3) | (1, −1, 1) | 101001011010 |
| 0b111110 | (3, 3, 3) | (1, 1, −1) | 101010100101 |
| 0b111111 | (3, 3, 3) | (1, −1, −1) | 101001010101 |

When the MS using the BFCH intends to transmit feedback information to support a MIMO mode, the BFCH is inappropriate due to a limited amount of information. Thus, the MS determines switching to the EFCH, transmits a predefined E1 code to the BS through the BFCH to report the determination result. In this case, since the BS is in a state of receiving feedback information of the MS through the BFCH, the BS detects the E1 code by performing code sequence detection using correlation values. Accordingly, the BS recognizes that the MS has requested switching to the EFCH mode, and switches the mode of the fast feedback channel of the MS to the EFCH mode in a next frame. Since the BFCH and the EFCH have the same resource structure, the switching to the EFCH mode does not require an additional resource allocation process. In another case, if the BS instructs the switching to the EFCH mode, the system defines a feedback channel type switch field in a map message, and the BS instructs the switching to the EFCH mode by using the feedback channel type switch field. In still another case, if a request and permission operation is required, mode switching is requested by the MS, and in response thereto, the BS permits the mode switching by using the map message.

Figure 4:
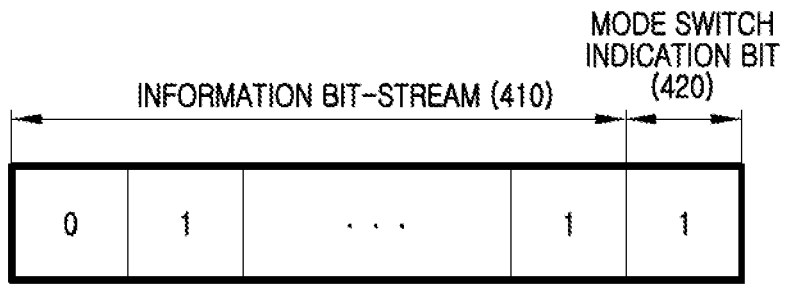
FIG. 4 illustrates a structure of a bit-stream transmitted through an EFCH in a broadband wireless communication system according to an exemplary embodiment of the present invention.

When the MS moves to a cell edge and thus an amount of feedback information decreases, the MIMO mode cannot be supported and thus an amount of feedback information decreases. Then, the MS determines to return to the BFCH mode and reports the determination result to the BS. In this case, two methods are proposed according to exemplary embodiments of the present invention. First, a field for reporting switching to the BFCH mode is defined among feedback information for the EFCH, and a bit of the field is set to '1' if the switching to the BFCH mode is requested, and the bit of the field is set to '0' if the EFCH mode is maintained. An example of constructing a feedback bit-stream transmitted through the EFCH according to the first method is shown in FIG. 4. That is, as shown in FIG. 4, the feedback bit-stream includes an information bit-stream 410 and a mode switch indication bit 420. Second, an E2 code for a request of switching to the BFCH mode is defined among code sequences for the BFCH, and returning to the BFCH is requested when the MS transmits the E2 code. In the second method, the BS and the MS both use a fast feedback channel of the EFCH mode, and the BS has to perform both coherent demodulation conforming to the EFCH mode and noncoherent demodulation conforming to the BFCH mode. In another case, if the switching to the BFCH mode is instructed by the BS, the system defines a feedback channel type switch field in a map message, and the BS instructs the switching to the BFCH mode by using the feedback channel type switch field. In still another case, if a request and permission operation is required, mode switching is requested by the MS, and in response thereto, the BS permits the mode switching by using the map message.

The BS recognizes the request of the MS for switching to the BFCH mode by using one of the two methods described above, and determines the switching to the BFCH mode in a next frame. According to an exemplary embodiment of the present invention, both or either one of the two methods may be used by selection of each MS. When the second method is used, the BS first attempts to detect a feedback bit-stream received through a fast feedback channel of the EFCH mode, and if an error occurs in the detection process, the BS attempts to detect the E2 code.

Hereinafter, an exemplary embodiment of switching between a BFCH mode and an EFCH mode according to the aforementioned mode switching method will be described.

Figure 5:
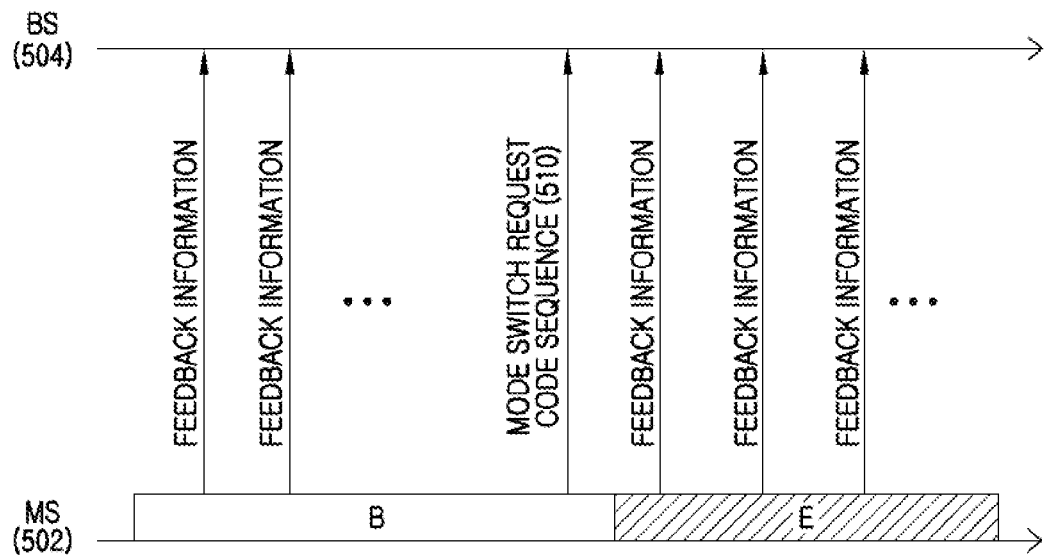
FIG. 5 illustrates a process of switching from a BFCH mode to an EFCH mode in a broadband wireless communication system according to an exemplary embodiment of the present invention.

FIG. 5 illustrates a process of switching from a BFCH mode to an EFCH mode in a broadband wireless communication system according to an exemplary embodiment of the present invention.

Referring to FIG. 5, an MS 502 transmits feedback information to a BS 504 through a feedback channel of the BFCH mode. In this case, the feedback information is periodically transmitted. While operating in the BFCH mode, the MS 502 determines switching to the EFCH mode and transmits a mode switch request code sequence 510 through the feedback channel of the BFCH mode. For example, the mode switch request code sequence 510 is either an E1 code dedicatedly allocated for switching from the BFCH mode to the EFCH mode or a code sequence indicating a preferred MIMO mode corresponding to a target EFCH mode to be switched. Thereafter, the MS 502 switches to the EFCH mode, and periodically transmits feedback information through a feedback channel of the EFCH mode. Herein, a feedback period of the BFCH mode and a feedback period of the EFCH mode may be substantially identical to or different from each other.

Figure 6:
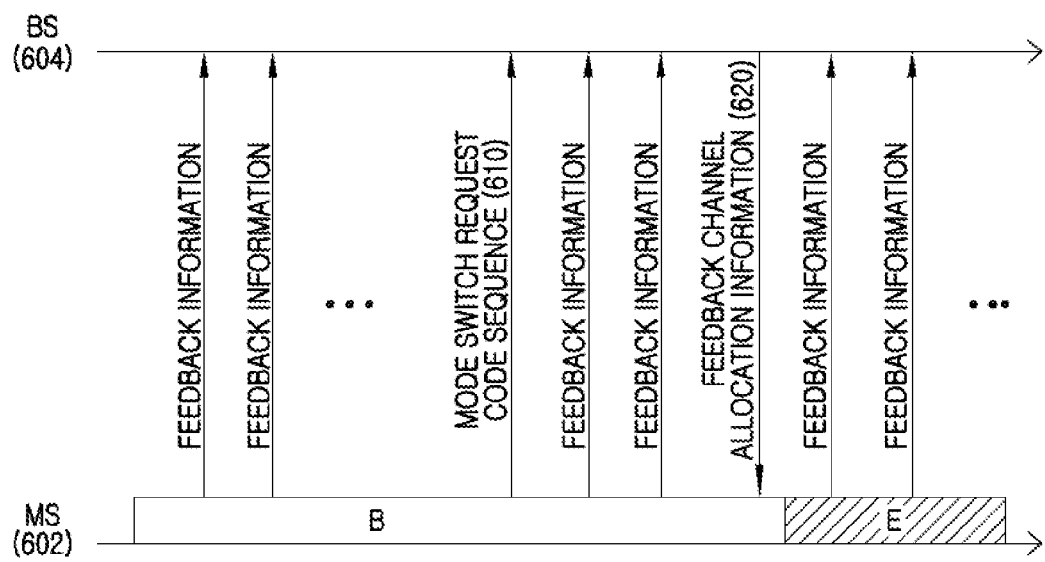
FIG. 6 illustrates a process of switching from a BFCH mode to an EFCH mode under the control of a Base Station (BS) in a broadband wireless communication system according to an exemplary embodiment of the present invention.

FIG. 6 illustrates a process of switching from a BFCH mode to an EFCH mode under the control of a BS in a broadband wireless communication system according to an exemplary embodiment of the present invention.

Referring to FIG. 6, an MS 602 transmits feedback information to a BS 604 through a feedback channel of the BFCH mode. In this case, the feedback information is periodically transmitted. While operating in the BFCH mode, the MS 602 determines switching to the EFCH mode and transmits a mode switch request code sequence 610 through the feedback channel of the BFCH mode. For example, the mode switch request code sequence 610 is either an E1 code dedicatedly allocated for switching from the BFCH mode to the EFCH mode or a code sequence indicating a preferred MIMO mode corresponding to a target EFCH mode to be switched. Unlike in the exemplary embodiment of FIG. 5, a permission of the BS 602 is required in the exemplary embodiment of FIG. 6, rather than mode switching is achieved only with the mode switch request code sequence 610. Therefore, the MS 602 remains in the BFCH mode after transmitting the mode switch request code sequence 610. In this case, the BS 604 determines whether a mode switch request of the MS is permitted, and if it is permitted, transmits feedback channel allocation information 620. The feedback channel allocation information 620 includes information indicating a feedback channel location, a feedback period, a feedback mode, etc. That is, when the feedback channel allocation information 620 is used, the feedback channel may be relocated. Upon receiving the feedback channel allocation information 620, the MS 602 switches to the EFCH mode, and periodically transmits feedback information through a feedback channel of the EFCH mode. Herein, a feedback period of the BFCH mode and a feedback period of the EFCH mode may be substantially identical to or different from each other.

Figure 7:
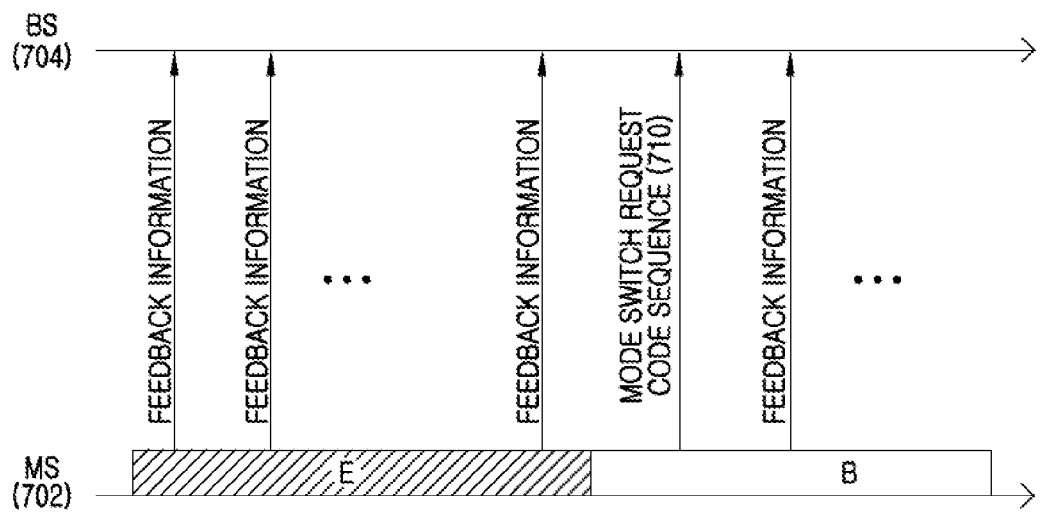
FIG. 7 illustrates a process of switching from an EFCH mode to a BFCH mode by using a code sequence of the BFCH mode in a broadband wireless communication system according to an exemplary embodiment of the present invention.

FIG. 7 illustrates a process of switching from an EFCH mode to a BFCH mode by using a code sequence of the BFCH mode in a broadband wireless communication system according to an exemplary embodiment of the present invention.

Referring to FIG. 7, an MS 702 transmits feedback information to a BS 704 through a feedback channel of the EFCH mode. In this case, the feedback information is periodically transmitted. While operating in the EFCH mode, the MS 702 determines switching to the BFCH mode and transmits a mode switch request code sequence 710 through a feedback channel of the BFCH mode. For example, the mode switch request code sequence 710 is either an E2 code dedicatedly allocated for switching from the EFCH mode to the BFCH mode or a code sequence indicating a preferred MIMO mode using the BFCH mode. Thereafter, the MS 702 periodically transmits feedback information through the feedback channel of the BFCH mode. Herein, a feedback period of the EFCH mode and a feedback period of the BFCH mode may be substantially identical to or different from each other.

Figure 8:
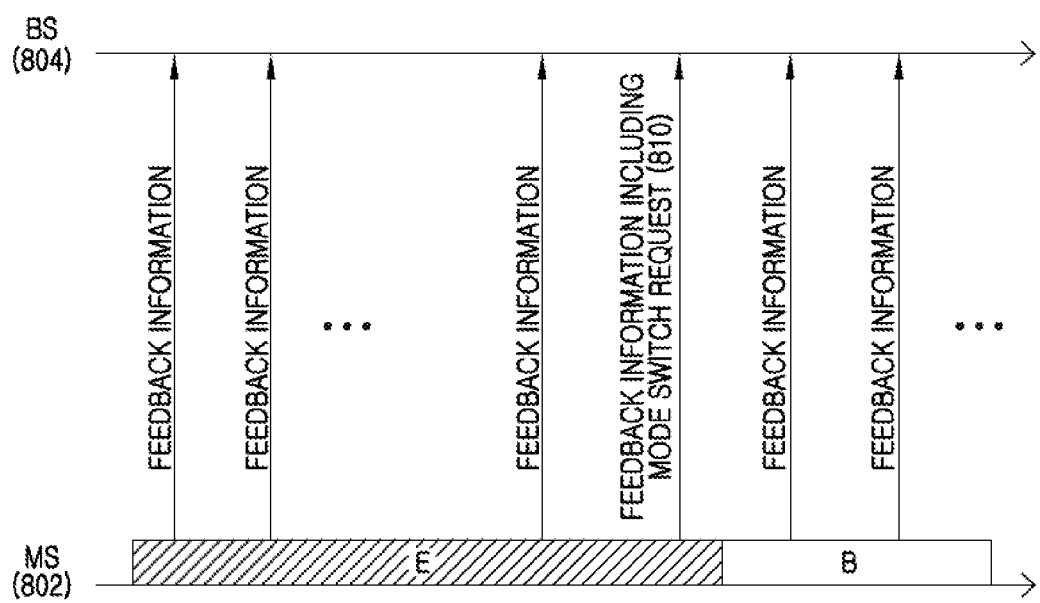
FIG. 8 illustrates a process of switching from an EFCH mode to a BFCH mode by using an indicator of the EFCH mode in a broadband wireless communication system according to an exemplary embodiment of the present invention.

FIG. 8 illustrates a process of switching from an EFCH mode to a BFCH mode by using an indicator of the EFCH mode in a broadband wireless communication system according to an exemplary embodiment of the present invention.

Referring to FIG. 8, an MS 802 transmits feedback information to a BS 804 through a feedback channel of the EFCH mode. In this case, the feedback information is periodically transmitted. While operating in the EFCH mode, the MS 802 determines switching to the BFCH mode and transmits feedback information including a mode switch request 810 through the feedback channel of the EFCH mode. For example, the mode switching request implies an activated mode switch indication bit of FIG. 4 above. That is, an indicator indicating the mode switch request is included in the feedback information transmitted according to the EFCH mode, and the indicator is set to an activated value if mode switching is requested, and is set to an inactivated value if mode switching is not requested. However, the feedback information transmitted according to the EFCH mode may have various formats, and in this case, feedback information of all formats may include the indicator, or only feedback information of some formats may include the indicator. Thereafter, the MS 802 switches to the BFCH mode, and periodically transmits feedback information through a feedback channel of the BFCH mode. Herein, a feedback period of the EFCH mode and a feedback period of the BFCH mode may be substantially identical to or different from each other.

Figure 9:
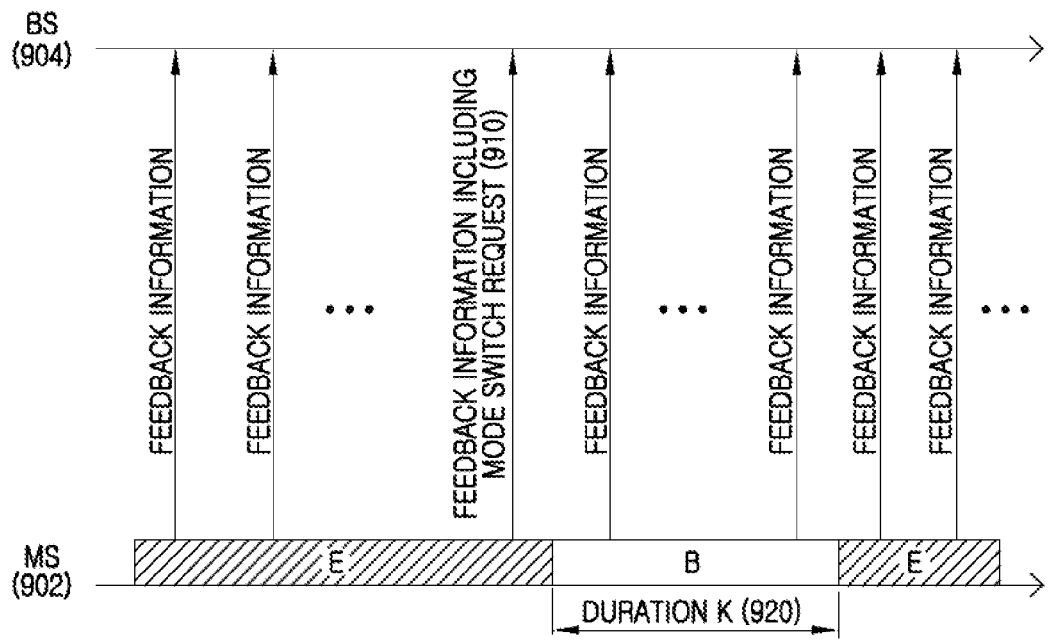
FIG. 9 illustrates a process of temporarily switching from an EFCH mode to a BFCH mode by using an indicator of the EFCH mode in a broadband wireless communication system according to an exemplary embodiment of the present invention.

FIG. 9 illustrates a process of temporarily switching from an EFCH mode to a BFCH mode by using an indicator of the EFCH mode in a broadband wireless communication system according to an exemplary embodiment of the present invention.

Referring to FIG. 9, an MS 902 transmits feedback information to a BS 904 through a feedback channel of the EFCH mode. In this case, the feedback information is periodically transmitted. While operating in the EFCH mode, the MS 902 determines switching to the BFCH mode and transmits feedback information including a mode switch request 910 through the feedback channel of the EFCH mode. For example, the mode switching request implies an activated mode switch indication bit of FIG. 4 above. That is, an indicator indicating the mode switch request is included in the feedback information transmitted according to the EFCH mode, and the indicator is set to an activated value if mode switching is requested, and is set to an inactivated value if mode switching is not requested. However, the feedback information transmitted according to the EFCH mode may have various formats, and in this case, feedback information of all formats may include the indicator, or only feedback information of some formats may include the indicator. Unlike in the embodiment of FIG. 8, the switching to the BFCH mode is temporarily achieved in the present embodiment, rather than mode switching is achieved completely at the mode switching request. Thereafter, the MS 902 switches to the BFCH mode, periodically transmits feedback information through a feedback channel of the BFCH mode during a duration K 920, and returns to the EFCH mode. Herein, a feedback period of the EFCH mode and a feedback period of the BFCH mode may be substantially identical to or different from each other.

Figure 10:
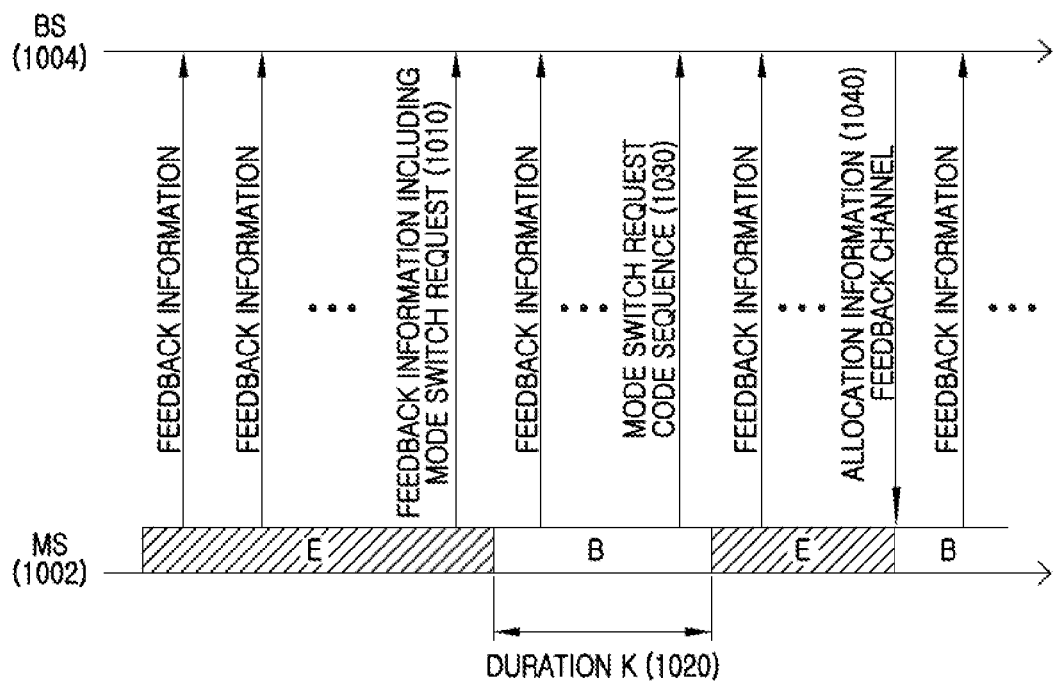
FIG. 10 illustrates a process of temporarily switching from an EFCH mode to a BFCH mode by using an indicator of the EFCH mode and then switching to the BFCH mode by using a code sequence of the BFCH mode in a broadband wireless communication system according to an exemplary embodiment of the present invention.

FIG. 10 illustrates a process of temporarily switching from an EFCH mode to a BFCH mode by using an indicator of the EFCH mode and then switching to the BFCH mode by using a code sequence of the BFCH mode in a broadband wireless communication system according to an exemplary embodiment of the present invention.

Referring to FIG. 10, an MS 1002 transmits feedback information to a BS 1004 through a feedback channel of the EFCH mode. In this case, the feedback information is periodically transmitted. While operating in the EFCH mode, the MS 1002 determines switching to the BFCH mode and transmits feedback information including a mode switch request 1010 through the feedback channel of the EFCH mode. For example, the mode switching request implies an activated mode switch indication bit of FIG. 4 above. That is, an indicator indicating the mode switch request is included in the feedback information transmitted according to the EFCH mode, and the indicator is set to an activated value if mode switching is requested, and is set to an inactivated value if mode switching is not requested. However, the feedback information transmitted according to the EFCH mode may have various formats, and in this case, feedback information of all formats may include the indicator, or only feedback information of some formats may include the indicator. Switching to the BFCH mode is temporarily achieved in the present embodiment, rather than mode switching is achieved completely at the mode switching request. Thereafter, the MS 1002 switches to the BFCH mode, periodically transmits feedback information through a feedback channel of the BFCH mode during a duration K 1020, and returns to the EFCH mode. In this case, the MS 1002 transmits a mode switch request code sequence 1030 through the feedback channel of the BFCH mode during the duration K 1020. For example, the mode switch request code sequence 1030 is either an E2 code dedicatedly allocated for switching from the EFCH mode to the BFCH mode or a code sequence indicating a preferred MIMO mode using the BFCH mode. Although it is shown in FIG. 10 that the mode switch request code sequence 1030 is transmitted by feedback of the last BFCH mode, the mode switch request code sequence 1030 may also be transmitted by feedback of the first BFCH mode or feedback of another BFCH mode. A permission of the BS 1004 is required in an exemplary embodiment of the present embodiment, rather than mode switching is achieved only with the mode switch request code sequence 1030. Therefore, the MS 1002 switches to the EFCH mode when the duration K 1020 ends, and then transmits feedback information through the feedback channel of the EFCH mode. In this case, the BS 1004 determines whether a mode switch request of the MS 1002 is permitted, and if it is permitted, transmits feedback channel allocation information 1040. The feedback channel allocation information 1040 includes information indicating a feedback channel location, a feedback period, a feedback mode, etc. That is, when the feedback channel allocation information 1040 is used, the feedback channel location may vary. Upon receiving the feedback channel allocation information 1040, the MS 1002 switches to the BFCH mode, and periodically transmits feedback information through the feedback channel of the BFCH mode. Herein, a feedback period of the BFCH mode and a feedback period of the EFCH mode may be substantially identical to or different from each other.

Figure 11:
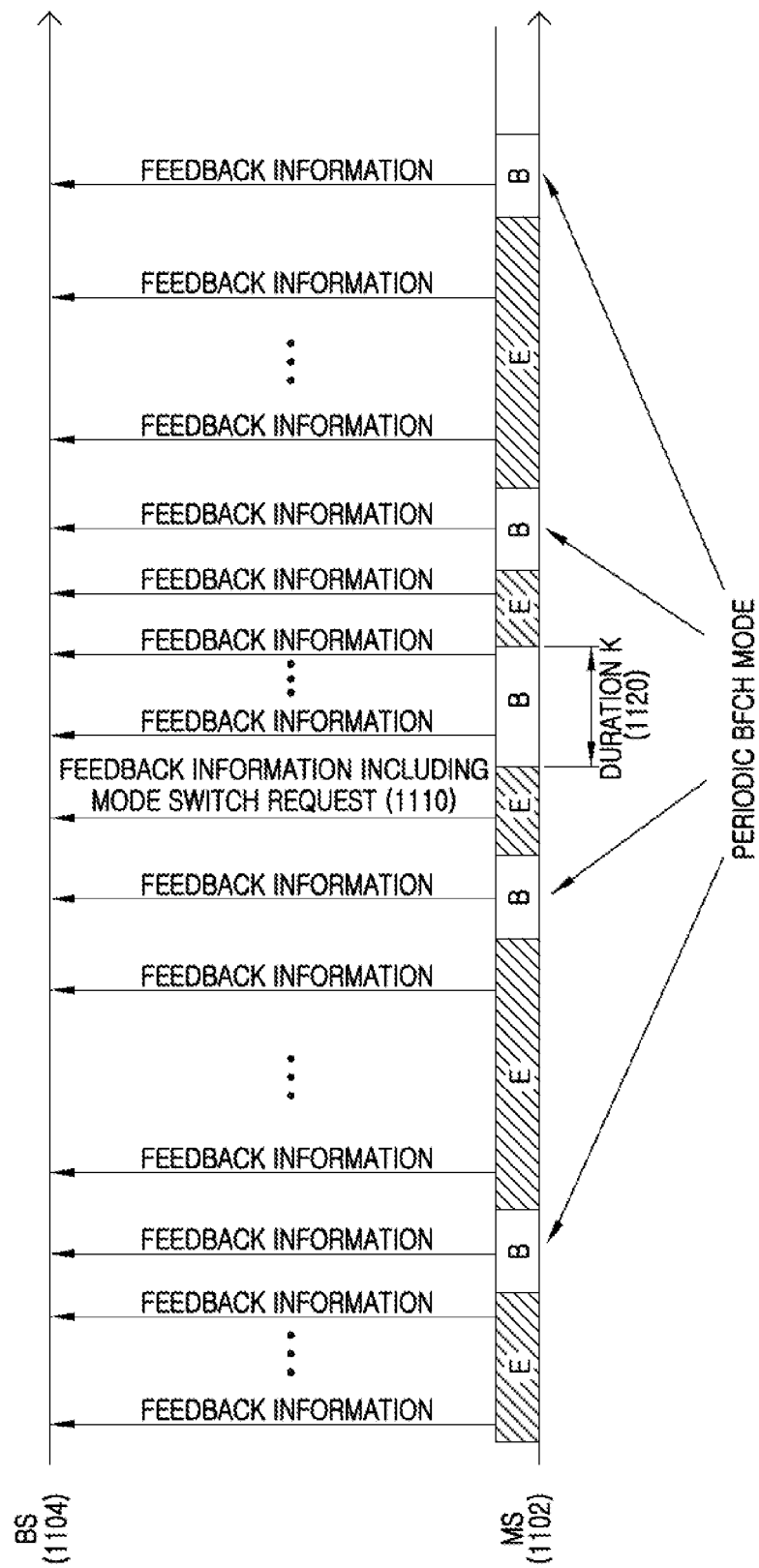
FIG. 11 illustrates a process of periodically switching to a BFCH mode while temporarily switching from an EFCH mode to the BFCH mode by using an indicator of the EFCH mode in a broadband wireless communication system according to an exemplary embodiment of the present invention.

FIG. 11 illustrates a process of periodically switching to a BFCH mode while temporarily switching from an EFCH mode to the BFCH mode by using an indicator of the EFCH mode in a broadband wireless communication system according to an exemplary embodiment of the present invention.

Referring to FIG. 11, an MS 1102 transmits feedback information to a BS 1104 through a feedback channel of the EFCH mode. While operating in the EFCH mode, an MS 1102 periodically switches to the BFCH mode. An interval of periodical switching to the BFCH mode is defined as the number of frames or the number of feedback attempts. In addition, a length of a duration in which the BFCH mode is maintained whenever switching to the BFCH mode occurs is defined as the number of frames or the number of feedback attempts. For example, the periodic switching to the BFCH mode may be defined as one feedback attempt every 128 frames. In addition, the exemplary embodiment of FIG. 11 allows temporarily switching to the BFCH mode when mode switching is requested through a feedback channel of the EFCH mode. Accordingly, while operating in the EFCH mode, the MS 1102 determines switching to the BFCH mode and transmits feedback information including a mode switch request 1110 through the feedback channel of the EFCH mode. For example, the mode switching request implies an activated mode switch indication bit of FIG. 4 above. That is, an indicator indicating the mode switch request is included in the feedback information transmitted according to the EFCH mode, and the indicator is set to an activated value if mode switching is requested, and is set to an inactivated value if mode switching is not requested. However, the feedback information transmitted according to the EFCH mode may have various formats, and in this case, feedback information of all formats may include the indicator, or only feedback information of some formats may include the indicator. Thereafter, the MS 1102 switches to the BFCH mode, periodically transmits feedback information through a feedback channel of the BFCH mode during a duration K 1120, and returns to the EFCH mode.

As described above, the exemplary embodiments of the present invention with reference to FIG. 5 to FIG. 11 assume a single EFCH mode. According to another exemplary embodiment of the present invention, a plurality of EFCH modes including different parameter items may exist according to a type of feedback information. In this case, as a mode switch request code sequence for requesting switching from the BFCH mode to the EFCH mode, a plurality of code sequences corresponding to the plurality of EFCH modes can be allocated. In addition, switching from one EFCH mode to another EFCH mode can also be performed. For switching between the EFCH modes, the exemplary embodiments shown in FIG. 7 to FIG. 11 can be used.

Hereinafter, exemplary operations and structures of an MS and a BS for operating a fast feedback channel will be described with reference to the accompanying drawings.

Figure 12:
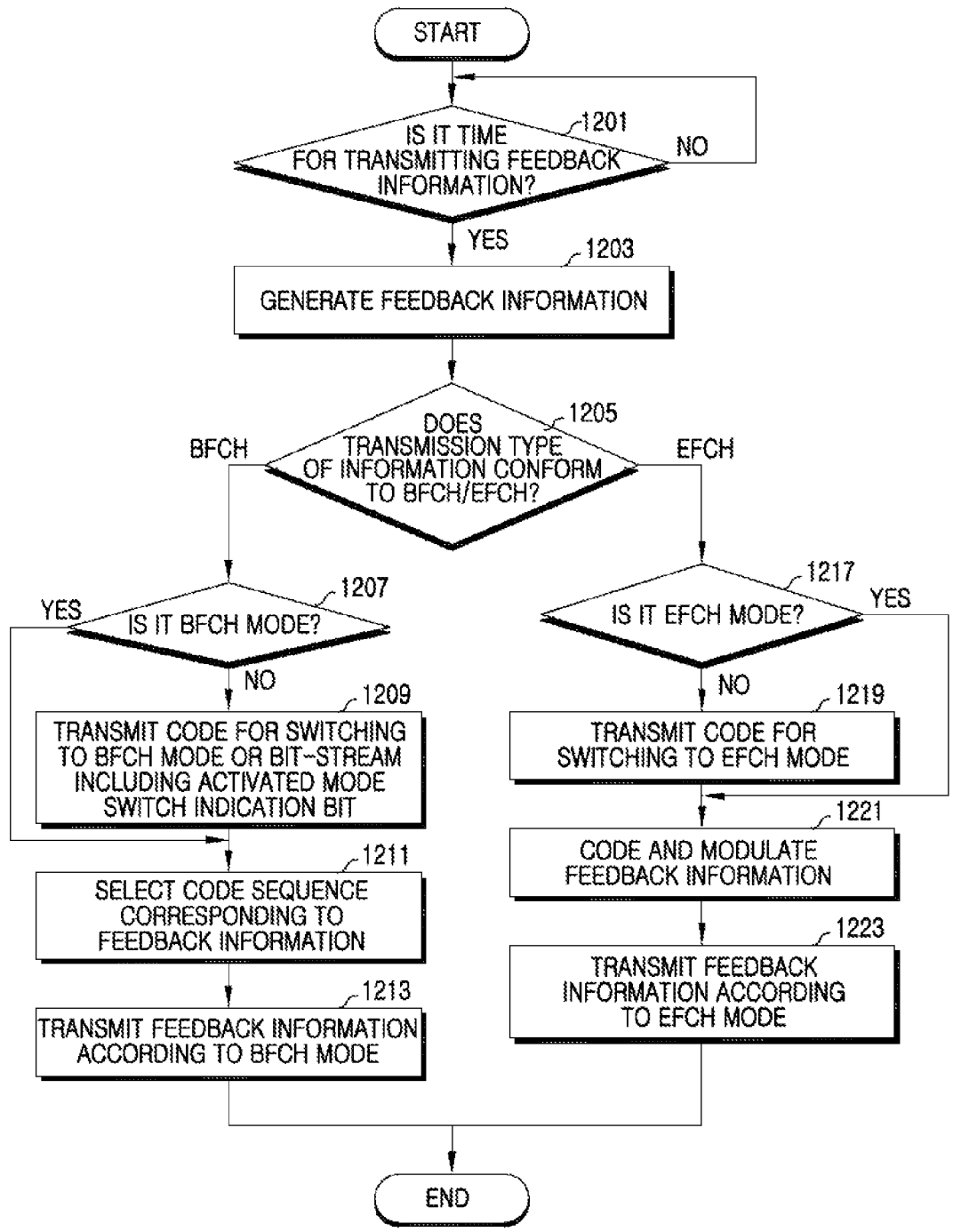
FIG. 12 is a flowchart illustrating an operation of a Mobile Station (MS) for switching a feedback mode without control of a BS in a broadband wireless communication system according to an exemplary embodiment of the present invention.

FIG. 12 is a flowchart illustrating a process of transmitting feedback information by an MS in a broadband wireless communication system according to an exemplary embodiment of the present invention. It is assumed that a permission of a BS is not necessary for the operation of the MS.

Referring to FIG. 12, the MS determines whether it is time for transmitting feedback information in step 1201. Since the MS periodically transmits the feedback information through a fast feedback channel allocated by the BS, the MS determines whether one period elapses after the feedback information is transmitted previously.

If it is determined that it is time for transmitting the feedback information, the MS generates the feedback information in step 1203. The feedback information includes at least one of items, i.e., CQI, a preferred sub-band index, a PMI or rank for a MIMO mode. In this case, the item included in the feedback information is determined by a Signal to Noise Ratio (SNR) of a downlink channel. More items may be included when a channel condition allows. In addition, a mode of a fast feedback channel is determined according to the items included in the feedback information.

After generating the feedback information, the MS determines whether a transmission type of the feedback information conforms to a BFCH mode or an EFCH mode in step 1205. That is, the MS determines whether the feedback information generated in step 1203 is feedback information to be transmitted to a BFCH or feedback information to be transmitted to an EFCH.

If it is determined that the transmission type of the feedback information conforms to the BFCH mode in step 1205, the MS determines whether the fast feedback channel currently operates in the BFCH mode in step 1207. That is, the MS determines whether the mode of the fast feedback channel needs to be switched. If it is determined that the fast feedback channel currently operates the BFCH mode, the MS proceeds to step 1211.

In contrast, if it is determined that the fast feedback channel does not currently operate in the BFCH mode, the MS transmits a code for switching to the BFCH mode or a bit-stream including an activated mode switch indication bit in step 1209. Herein, the code for switching to the BFCH mode is one of code sequences transmitted through the BFCH, and the bit-stream including the activated mode switch indication bit is a bit-stream transmitted through the EFCH. Therefore, when transmitting the code for switching to the BFCH mode, the MS configures and transmits the BFCH, and when transmitting the bit-stream including the activated mode switch indication bit, the MS configures and transmits the EFCH. In this case, which one will be transmitted between the code for switching to the BFCH mode or the bit-stream including the activated mode switch indication bit may differ according to an exemplary embodiment of the present invention.

In step 1211, the MS selects a code sequence corresponding to the feedback information generated in step 1203. In other words, the MS selects a payload corresponding to the feedback information, and selects a code sequence corresponding to the payload from code sequences for the BFCH.

After selecting the code sequence, the MS configures the BFCH by using the code sequence and transmits the BFCH in step 1213. That is, the MS generates a feedback signal to be transmitted through the fast feedback channel according to a coherent modulation scheme. More specifically, the MS converts the code sequence into complex symbols, and configures the BFCH by assigning the complex symbols according to a structure of the BFCH. Further, the MS transmits the BFCH by using a resource allocated for the fast feedback channel.

If the transmission type of the feedback information conforms to the EFCH mode in step 1205, the MS determines whether the fast feedback channel currently operates in the EFCH mode in step 1217. That is, the MS determines whether the mode of the fast feedback channel needs to be switched. If the fast feedback channel currently operates in the EFCH mode, the MS proceeds to step 1221.

In contrast, if it is determined that the fast feedback channel does not currently operate in the EFCH mode, the MS transmits the code for switching to the EFCH mode in step 1219. The code for switching to the EFCH mode is one of code sequences transmitted through the EFCH. Therefore, the MS configures and transmits the EFCH by using the code for switching to the EFCH mode.

In step 1221, the MS performs coding and modulation on the feedback information generated in step 1203. In other words, the MS generates complex symbols to be transmitted through the EFCH by coding and modulating the feedback information.

After coding and modulating the feedback information, the MS configures the EFCH by using the complex symbols and then transmits the EFCH in step 1223. That is, the MS generates a feedback signal to be transmitted through the fast feedback channel according to the coherent modulation scheme. In other words, the MS configures the EFCH by assigning the complex symbols and pilot symbols according to a structure of the EFCH. Then, the MS transmits the EFCH by using a resource allocated for the fast feedback channel.

Figure 13:
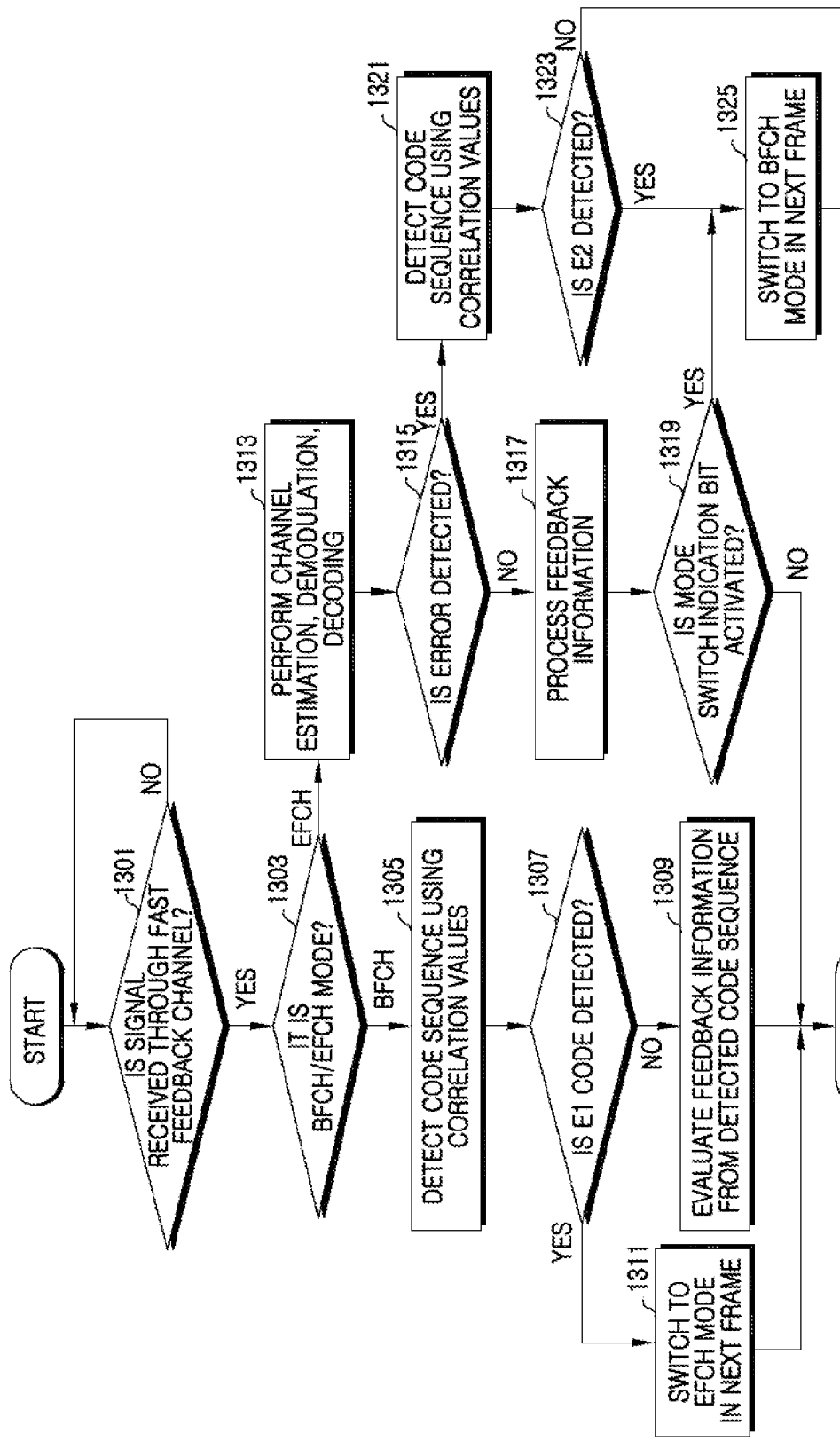
FIG. 13 is a flowchart illustrating an operation of a BS which does not control switching of a feedback mode in a broadband wireless communication system according to an exemplary embodiment of the present invention.

FIG. 13 is a flowchart illustrating a process of transmitting feedback information by a BS in a broadband wireless communication system according to an exemplary embodiment of the present invention. In FIG. 13, the BS receives feedback information for a single MS. If the BS communicates with a plurality of MSs, the processes of FIG. 13 may be concurrently performed as many as the number of the MSs. It is assumed that a permission of the BS is not necessary for the operation of the MS.

Referring to FIG. 13, the BS determines whether fast feedback information is received in step 1301. That is, the BS determines whether feedback information is received through a fast feedback channel.

Upon receiving the feedback information, the BS determines whether the fast feedback channel currently operates in a BFCH mode or an EFCH mode in step 1303. That is, the BS determines a demodulation scheme of the signal received through the fast feedback channel.

If it is determined that the fast feedback channel currently operates in the BFCH mode, the BS detects a Transmit (Tx) code sequence by using correlation values between each of candidate code sequences and the received signal in step 1305. That is, the BS detects the Tx code sequence from the signal received through the fast feedback channel according to a noncoherent demodulation scheme. More specifically, the BS calculates correlation values between each of available code sequences and the received signal. In this case, the BS calculates correlation values for each of a plurality of tiles and then performs a square operation on each correlation value. Further, the BS adds the squared correlation values calculated using the same candidate code sequence from the correlation values calculated from each tile, and then searches for a candidate code sequence corresponding to a maximum sum of the squared correlation values.

After detecting the code sequence, the BS determines whether the detected code sequence is an E1 code in step 1307. In other words, the BS determines whether the detected code sequence is for switching to the EFCH mode. In this case, according to another exemplary embodiment of the present invention, the code sequence for switching to the EFCH mode may be not the E1 code but a code sequence that indicates a preferred MIMO mode using the EFCH mode.

If it is determined that the detected code sequence is not the E1 code in step 1307, the BS evaluates the feedback information from the detected code sequence in step 1309. In other words, the BS evaluates a payload corresponding to the detected code sequence, and then evaluates the feedback information corresponding to the payload. For example, the BS evaluates a CQI of the MS by using the feedback information.

In contrast, if it is determined that the detected code sequence is the E1 code in step 1307, the BS determines switching to the fast feedback channel to the EFCH mode in a next frame in step 1311. Accordingly, in the next frame, the BS detects feedback information according to the EFCH mode.

If it is determined that the fast feedback channel currently operates in the EFCH mode in step 1303, the BS detects a feedback bit-stream by performing channel estimation, demodulation, and decoding in step 1313. That is, the BS detects a feedback bit-stream from the signal received through the fast feedback channel according to the coherent demodulation scheme. More specifically, the BS extracts pilot symbols from the signal received through the fast feedback channel, and then estimates a channel. Thereafter, the BS compensates for channel distortion of information symbols by using the estimated channel, and performs demodulation and decoding on the information symbols.

After detecting the feedback bit-stream, the BS evaluates whether an error occurs in the detected feedback bit-stream in step 1315. For example, the BS determines the occurrence of error by performing Cyclic Redundancy Check (CRC) processing, reliability estimation on channel decoding, etc.

If it is determined that there is no error in step 1315, the BS evaluates the feedback information in step 1317. In other words, the BS divides the feedback bit-streams into an information bit-stream and a mode switch indication bit, and evaluates the feedback information included in the information bit-stream. For example, the BS evaluates a CQI, a preferred sub-band, a PMI, a rank, etc., of the MS by using the feedback information.

After evaluating the feedback information, the BS determines whether the mode switch indication bit is activated in step 1319. In other words, the BS determines whether the mode switch indication bit is set to '1'. That is, the BS determines whether switching to the BFCH mode is requested from the MS. If it is determined that the mode switch indication bit is activated in step 1319, the BS proceeds to step 1325.

If it is determined that an error occurs in step 1315, the BS detects a Tx code sequence by using correlation values between each of candidate code sequences and the received signal in step 1321. More specifically, the BS calculates correlation values between each of available code sequences and the received signal. In this case, the BS calculates correlation values for each of a plurality of tiles and then performs a square operation on each correlation value. Further, the BS adds the squared correlation values calculated using the same candidate code sequence from the correlation values calculated from each tile, and then searches for a candidate code sequence corresponding to a maximum sum of the squared correlation values.

After detecting the code sequence, the BS determines whether the detected code sequence is an E2 code in step 1323. In other words, the BS determines whether the detected code sequence is for switching to the BFCH mode. That is, the BS determines whether switching to the BFCH mode is requested from the MS. According to another exemplary embodiment of the present invention, whether switching to the BFCH mode is requested can be determined according to whether a code sequence indicating a preferred MIMO mode is received. In this case, the BS determines whether the code sequence indicating the preferred MIMO mode is received.

In contrast, if it is determined that the detected code sequence is the E2 code in step 1323, the BS determines to switch the fast feedback channel to the BFCH mode in a next frame in step 1325. Accordingly, in the next frame, the BS detects feedback information according to the BFCH mode.

In the process of operating the BS as shown in FIG. 13, the BS attempts to detect the E2 code for switching to the BFCH mode and also attempts to detect whether the mode switch indication bit is activated. However, according to an exemplary embodiment of the present invention, step 1321 and step 1323 may be omitted when the BS does not attempt to detect the E2 code for switching to the BFCH mode, or step 1319 may be omitted when the BS does not attempt to detect whether the mode switch indication bit is activated.

Figure 14:
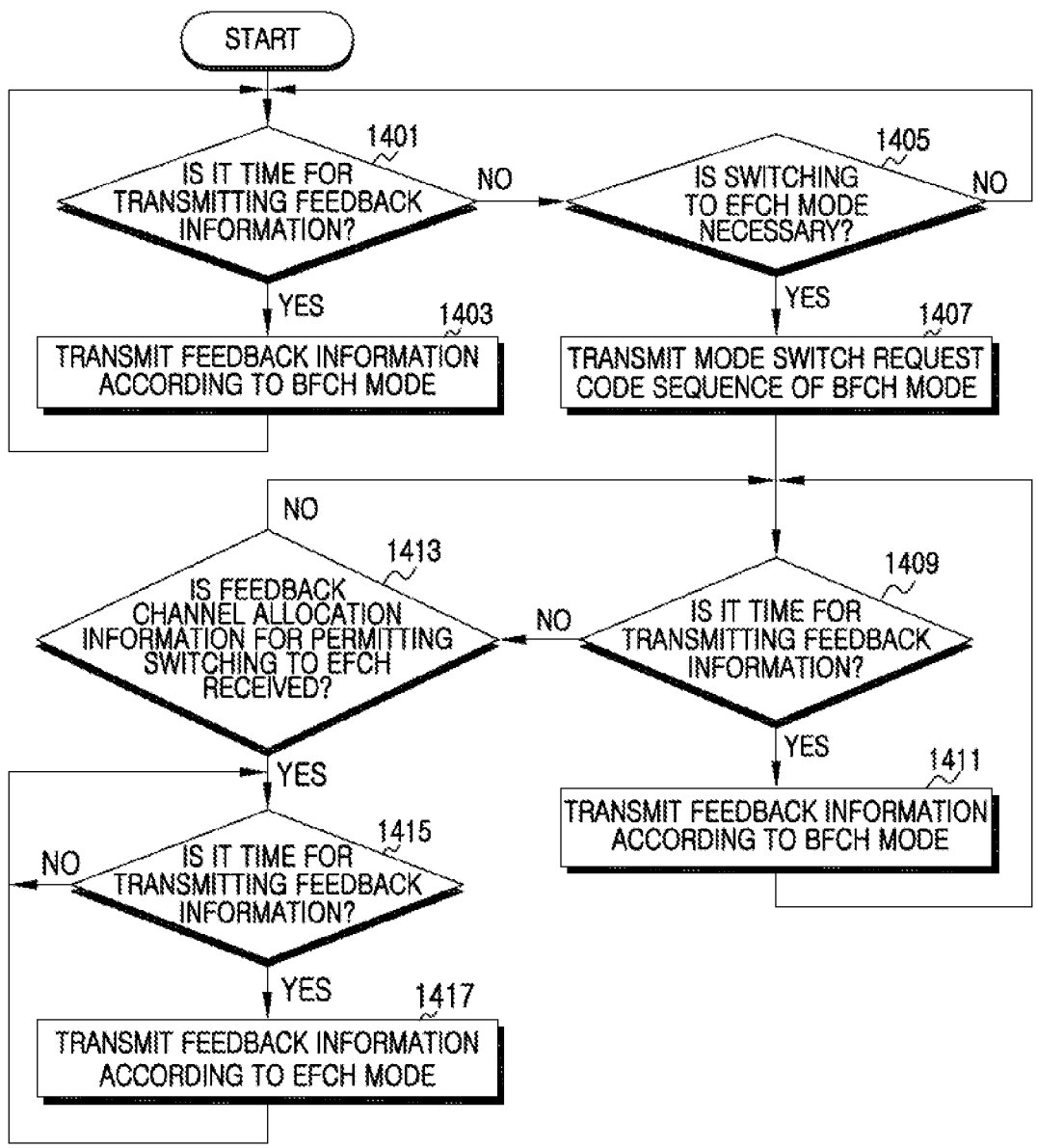
FIG. 14 is a flowchart illustrating an operation of an MS for switching from a BFCH mode to an EFCH mode under the control of a BS in a broadband wireless communication system according to an exemplary embodiment of the present invention.

FIG. 14 is a flowchart illustrating an operation of an MS for switching from a BFCH mode to an EFCH mode under the control of a BS in a broadband wireless communication system according to an exemplary embodiment of the present invention.

Referring to FIG. 14, the MS determines whether it is time for transmitting feedback information in step 1401. Since the MS periodically transmits the feedback information through a fast feedback channel allocated by the BS, the MS determines whether one period elapses after the feedback information is transmitted previously. The period is determined according to a mode of the feedback channel. The feedback channel of the MS currently operates in the BFCH mode.

If it is determined that it is time for transmitting the feedback information in step 1401, the MS transmits the feedback information according to the BFCH mode in step 1403. More specifically, the MS generates the feedback information, and selects a code sequence corresponding to the feedback information. Further, the MS converts the code sequence into complex symbols, and transmits the complex symbols through the feedback channel of the BFCH mode. Thereafter, the MS returns to step 1401.

If it is determined that it is not time for transmitting the feedback information in step 1401, the MS determines whether switching to the EFCH mode is necessary in step 1405. The switching to the EFCH mode is determined according to changes in a type of the feedback information. The type of the feedback information is determined according to a communication mode. For example, when intending to operate in a MIMO mode, the MS determines switching to the EFCH mode. If the switching to the EFCH mode is not necessary, the MS returns to step 1401.

In contrast, if it is determined that the switching to the EFCH mode is necessary in step 1405, the MS transmits a mode switch request code sequence of the BFCH mode in step 1407. In other words, the MS selects a code sequence assigned for a mode switch request from a plurality of transmissible code sequences in the BFCH mode, converts the code sequence into complex symbols, and transmits the complex symbols through the feedback channel of the BFCH mode. For example, the mode switch request code sequence is either an E1 code dedicatedly allocated for switching from the BFCH mode to the EFCH mode or a code sequence indicating a preferred MIMO mode using the EFCH mode to be switched.

In step 1409, the MS determines whether it is time for transmitting feedback information. Since the MS periodically transmits the feedback information through the fast feedback channel allocated by the BS, the MS determines whether one period elapses after the feedback information is transmitted previously. The period is determined according to the mode of the feedback channel. Since there is no permission from the BS after transmitting the mode switch request code sequence, the feedback channel currently operates in the BFCH mode.

If it is determined that it is time for transmitting the feedback information in step 1409, the MS transmits the feedback information according to the BFCH mode in step 1411. More specifically, the MS generates the feedback information, and selects a code sequence corresponding to the feedback information. Further, the MS converts the code sequence into complex symbols, and transmits the complex symbols through the feedback channel operating in the BFCH mode. Thereafter, the MS returns to step 1409.

If it is determined that it is not time for transmitting the feedback information in step 1409, the MS determines whether feedback channel allocation information for permitting switching to the EFCH is received in step 1413. The feedback channel allocation information includes information indicating a feedback channel location, a feedback period, a feedback mode, etc. In this case, the feedback channel allocation information includes information for allocating a feedback channel of the EFCH mode.

Upon receiving the feedback channel allocation information, the MS determines whether it is time for transmitting feedback information in step 1415. Since the MS periodically transmits the feedback information through the fast feedback channel allocated by the BS, the MS determines whether one period elapses after the feedback information is transmitted previously. The period is determined according to the mode of the feedback channel. Since switching to the EFCH mode is permitted by the BS, the feedback channel currently operates in the BFCH mode.

If it is determined that it is time for transmitting the feedback information in step 1415, the MS transmits the feedback information according to the EFCH mode in step 1417. More specifically, the MS generates the feedback information, and generates complex symbols to be transmitted through the EFCH by coding and modulating the feedback information. Further, the MS transmits the complex symbols and pilot symbols through the feedback channel of the EFCH mode.

Figure 15:
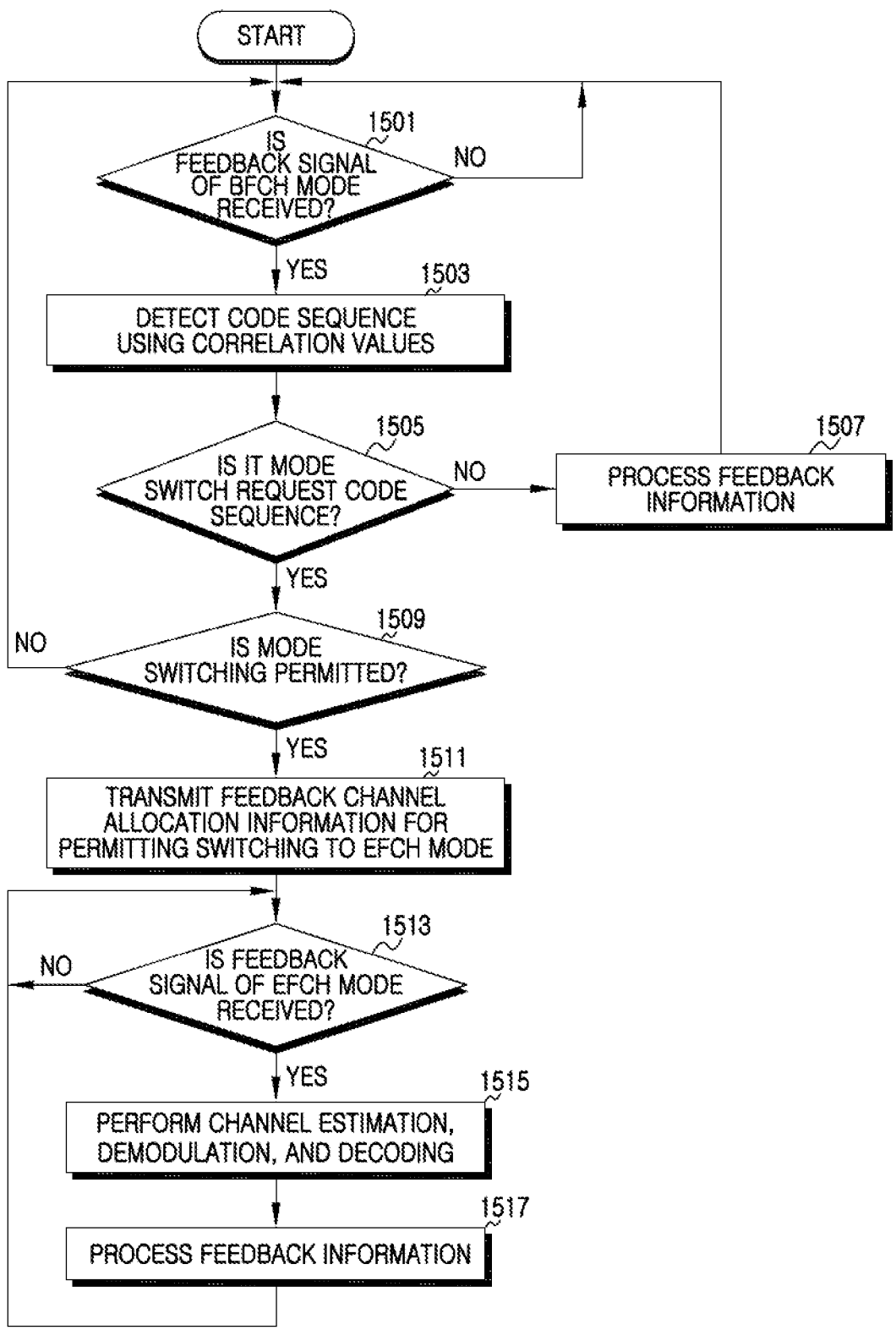
FIG. 15 is a flowchart illustrating an operation of a BS for controlling switching from a BFCH mode to an EFCH mode in a broadband wireless communication system according to an exemplary embodiment of the present invention.

FIG. 15 is a flowchart illustrating an operation of a BS for controlling switching from a BFCH mode to an EFCH mode in a broadband wireless communication system according to an exemplary embodiment of the present invention.

Referring to FIG. 15, the BS determines whether a feedback signal of the BFCH mode is received in step 1501. That is, a feedback channel of a corresponding MS currently operates in the BFCH mode, and the feedback signal is periodically received.

Upon receiving the feedback signal of the BFCH mode, the BS detects a Tx code sequence by using correlation value between each of candidate code sequences and the received signal in step 1503. That is, the BS detects the Tx code sequence from the signal received through the fast feedback channel according to a noncoherent demodulation scheme. More specifically, the BS calculates correlation values between each of available code sequences and the received signal. For example, the BS calculates correlation values for each of a plurality of tiles and then performs a square operation on each correlation value. Further, the BS adds the squared correlation values calculated using the same candidate code sequence from the correlation values calculated from each tile, and then searches for a candidate code sequence corresponding to a maximum sum of the squared correlation values.

After detecting the transmitted code sequence, the BS determines whether the detected code sequence is a mode switch request code sequence in step 1505. The mode switch request code sequence implies a code sequence assigned for a mode switch request from a plurality of transmissible code sequences in the BFCH mode. Since the feedback channel currently operates in the BFCH mode, the mode switch request code sequence implies a code sequence for requesting switching from the BFCH mode to the EFCH mode. For example, the mode switch request code sequence is either an E1 code dedicatedly allocated for switching from the BFCH mode to the EFCH mode or a code sequence indicating a preferred MIMO mode using the EFCH mode to be switched.

If it is determined that the detected code sequence is not the mode switch request code sequence in step 1505, the BS evaluates a codeword corresponding to the detected code sequence and processes feedback information indicated by the codeword in step 1507. For example, the feedback information may be a CQI, an event trigger, etc.

In contrast, if the detected code sequence is the mode switch request code sequence in step 1505, the BS determines whether mode switching of the feedback channel will be permitted in step 1509. Whether to permit the mode switching is determined by the number of unoccupied feedback channels, supportability of an operation of a corresponding mode, etc. If the mode switching of the feedback channel cannot be permitted, the BS returns to step 1501.

In contrast, if it is determined that the mode switching of the feedback channel can be permitted in step 1509, the BS transmits feedback channel allocation information for permitting switching to the EFCH mode in step 1511. The feedback channel allocation information includes information indicating a feedback channel location, a feedback period, a feedback mode, etc. In this case, the feedback channel allocation information includes information for allocating the feedback channel of the EFCH mode.

In step 1513, the BS determines whether a feedback signal of the EFCH mode is received. That is, the feedback channel of the MS currently operates in the EFCH mode, and the feedback signal is periodically received.

Upon receiving the feedback signal of the EFCH mode, the BS determines a feedback bit-stream by performing channel estimation, demodulation, and decoding in step 1515. That is, the BS detects a feedback bit-stream from a signal received through the fast feedback channel according to a coherent demodulation scheme. More specifically, the BS extracts pilot symbols from the signal received through the fast feedback channel, and then estimates a channel. Thereafter, the BS compensates for channel distortion of information symbols by using the estimated channel, and performs demodulation and decoding on the information symbols.

After detecting the feedback bit-stream, the BS processes feedback information indicated by the detected bit-stream in step 1517. For example, the BS evaluates a CQI, a preferred sub-band, a PMI, a rank, etc., by using the feedback information. Thereafter, the BS returns to step 1513.

Figure 16:
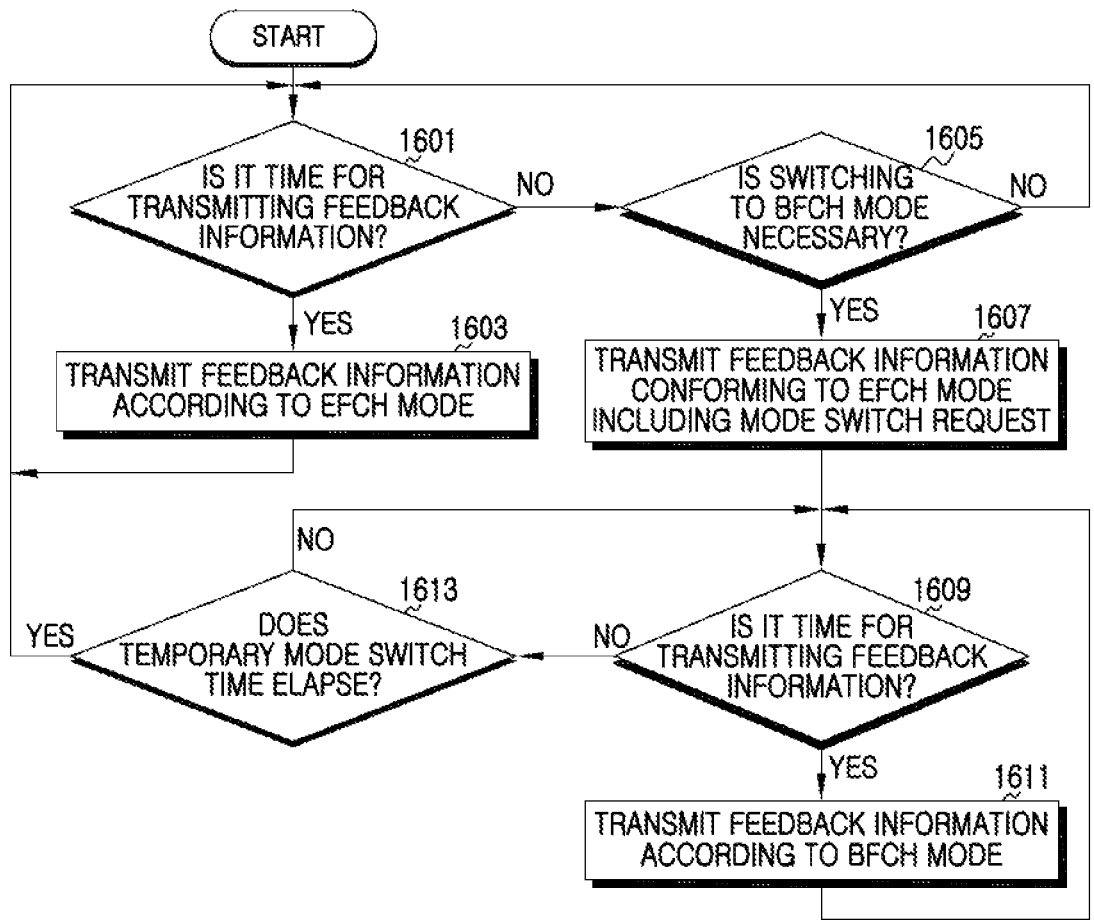
FIG. 16 is a flowchart illustrating an operation of an MS for temporarily switching from an EFCH mode to a BFCH mode in a broadband wireless communication system according to an exemplary embodiment of the present invention.

FIG. 16 is a flowchart illustrating an operation of an MS for temporarily switching from an EFCH mode to a BFCH mode in a broadband wireless communication system according to an exemplary embodiment of the present invention.

Referring to FIG. 16, the MS determines whether it is time for transmitting feedback information in step 1601. Since the MS periodically transmits the feedback information through a fast feedback channel allocated by a BS, the MS determines whether one period elapses after the feedback information is transmitted previously. The period is determined according to a mode of the feedback channel. The feedback channel of the MS currently operates in the EFCH mode.

If it is determined that it is time for transmitting the feedback information in step 1601, the MS transmits the feedback information according to the EFCH mode in step 1603. More specifically, the MS generates the feedback information, and generates complex symbols to be transmitted through an EFCH by coding and modulating the feedback information. Further, the MS transmits the complex symbols and pilot symbols through the feedback channel of the EFCH mode. Therefore, the MS returns to step 1601.

If it is determined that it is not time for transmitting the feedback information in step 1601, the MS determines whether switching to the BFCH mode is necessary in step 1605. The switching to the BFCH mode is determined according to changes in a type of the feedback information. The type of the feedback information is determined according to a communication mode. For example, when intending to deactivate a MIMO mode while operating in the MIMO mode, the MS determines switching to the BFCH mode. If the switching to the BFCH mode is not necessary, the MS returns to step 1601.

In contrast, if it is determined that the switching to the BFCH mode is necessary in step 1605, the MS transmits feedback information including a mode switch request according to the EFCH mode in step 1607. That is, the MS transmits feedback information according to a transmission period by appending the mode switch request to the feedback information. For example, the mode switch request may be a 1-bit indicator as shown in the mode switch indication bit 420 of FIG. 4. That is, an indicator that indicates the mode switch request is included in feedback information transmitted according to the EFCH mode, and is set to an activated value if mode switching is requested and is set to an inactivated value if mode switching is not requested. However, feedback information transmitted according to the EFCH mode may have various formats, and in this case, feedback information of all formats may include the indicator or only feedback information of some formats may include the indicator.

In step 1609, the MS determines whether it is time for transmitting feedback information. Since the MS periodically transmits the feedback information through the fast feedback channel allocated by the BS, the MS determines whether one period elapses after previous feedback information is transmitted. The period is determined according to the mode of the feedback channel. Since the feedback information is transmitted according to the EFCH mode including the mode switch request, the feedback channel of the MS currently operates in a temporary BFCH mode.

If it is determined that it is time for transmitting the feedback information in step 1609, the MS transmits the feedback information according to the BFCH mode in step 1611. More specifically, the MS generates the feedback information, and selects a code sequence corresponding to the feedback information. Further, the MS converts the code sequence into complex symbols, and transmits the complex symbols through the feedback channel operating in the BFCH mode. Thereafter, the MS returns to step 1609.

If it is determined that it is not time for transmitting the feedback information in step 1601, the MS determines whether a temporary mode switch time elapses in step 1613. That is, after transmitting the feedback information including the mode switch request, the temporary mode switch time starts to elapse, and the MS determines whether the temporary mode switch time elapses. If the temporary mode switch time does not elapse, the MS returns to step 1609. Otherwise, if the temporary mode switch time elapses, the MS returns to step 1601.

Figure 17:
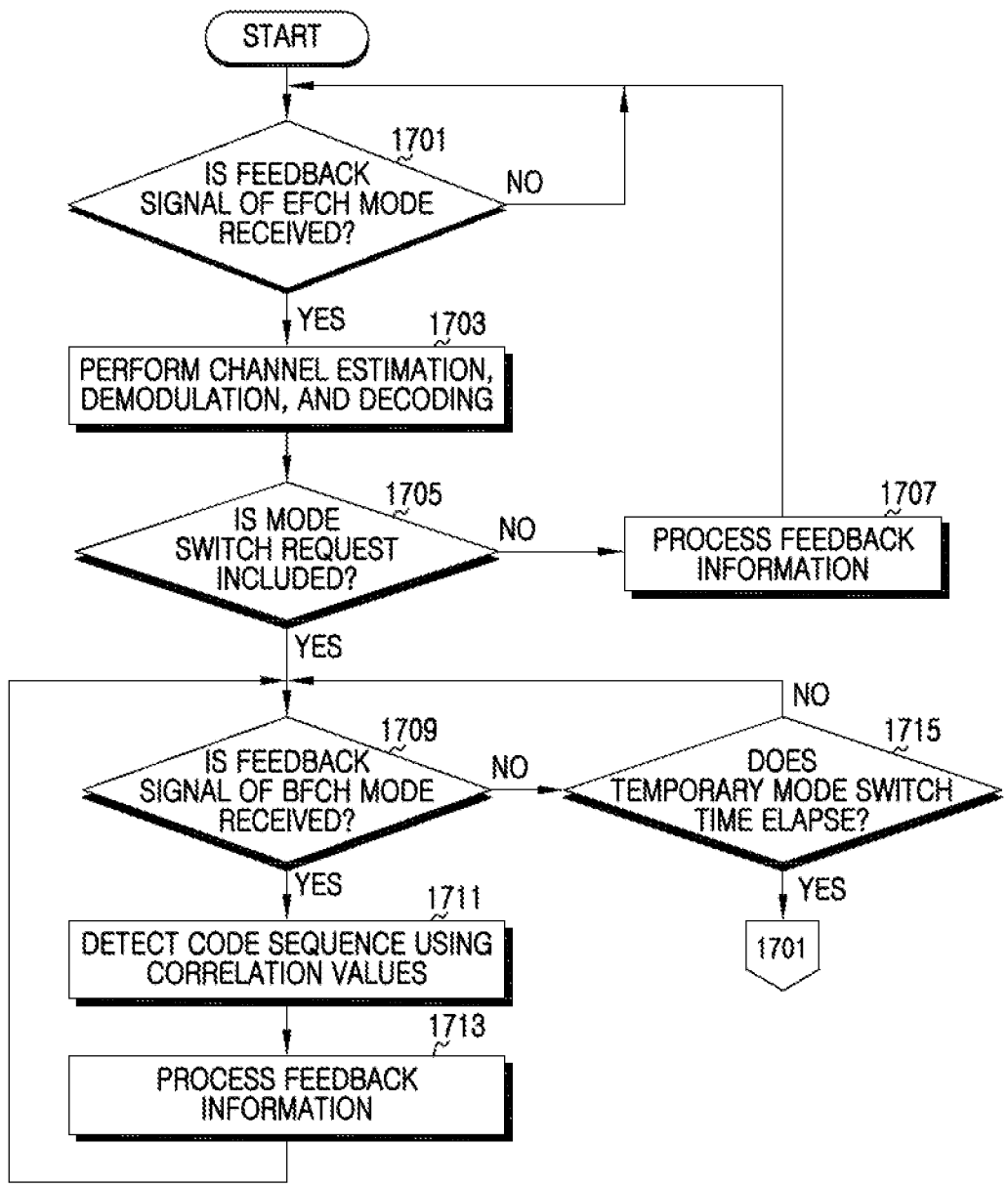
FIG. 17 is a flowchart illustrating an operation of a BS corresponding to an MS for temporarily switching from an EFCH mode to a BFCH mode in a broadband wireless communication system according to an exemplary embodiment of the present invention.

FIG. 17 is a flowchart illustrating an operation of a BS corresponding to an MS for temporarily switching from an EFCH mode to a BFCH mode in a broadband wireless communication system according to an exemplary embodiment of the present invention.

Referring to FIG. 17, the BS determines whether a feedback signal of the EFCH mode is received in step 1701. That is, a feedback channel of the MS currently operates in the EFCH mode, and the feedback signal is periodically received.

Upon receiving the feedback signal of the EFCH mode, the BS detects a feedback bit-stream by performing channel estimation, demodulation, and decoding in step 1703. That is, the BS detects a feedback bit-stream from a signal received through the fast feedback channel according to a coherent demodulation scheme. More specifically, the BS extracts pilot symbols from the signal received through the fast feedback channel, and then estimates a channel. Thereafter, the BS compensates for channel distortion of information symbols by using the estimated channel, and performs demodulation and decoding on the information symbols.

After detecting the feedback bit-stream, the BS determines whether a mode switch request is included in the feedback bit-stream in step 1705. The mode switch request is information for reporting a request for switching from the EFCH mode to the BFCH mode. For example, the mode switch request may be a 1-bit indicator as shown in the mode switch indication bit 420 of FIG. 4. That is, an indicator that indicates the mode switch request is included in feedback information transmitted according to the EFCH mode, and is set to an activated value if mode switching is requested and is set to an inactivated value if mode switching is not requested. However, feedback information transmitted according to the EFCH mode may have various formats, and in this case, feedback information of all formats may include the indicator or only feedback information of some formats may include the indicator.

In contrast, if it is determined that the mode switch request is not included in step 1705, the BS processes feedback information indicated by the detected bit-stream in step 1707. For example, the BS evaluates a CQI, a preferred sub-band, a PMI, a rank, etc., by using the feedback information. Thereafter, the BS returns to step 1701.

In contrast, if it is determined that the mode switch request is included in step 1705, the BS determines whether a feedback signal of the BFCH mode is received in step 1709. That is, the feedback channel of the MS currently operates in a temporary BFCH mode due to the mode switch request, and the feedback signal is periodically received.

Upon receiving the feedback signal of the BFCH mode in step 1709, the BS detects a Tx code sequence by using correlation values between each of candidate code sequences and the received signal in step 1711. That is, the BS detects the Tx code sequence from the signal received through the fast feedback channel according to a noncoherent demodulation scheme. More specifically, the BS calculates correlation values between each of available code sequences and the received signal. For example, the BS calculates correlation values for each of a plurality of tiles and then performs a square operation on each correlation value. Further, the BS adds the squared correlation values calculated using the same candidate code sequence from the correlation values calculated from each tile, and then searches for a candidate code sequence corresponding to a maximum sum of the squared correlation values.

In step 1713, the BS evaluates a codeword corresponding to the detected code sequence, and processes feedback information indicated by the codeword. For example, the feedback information may be a CQI, an event trigger, etc.

If it is determined that the feedback signal of the BFCH mode is not received in step 1709, the BS determines whether a temporary mode switch time elapses in step 1715. That is, after transmitting the feedback information including the mode switch request, the temporary mode switch time starts to elapse, and the BS determines whether the temporary mode switch time elapses. If the temporary mode switch time does not elapse, the BS returns to step 1709. Otherwise, if the temporary mode switch time elapses, the BS returns to step 1701.

Figure 18:
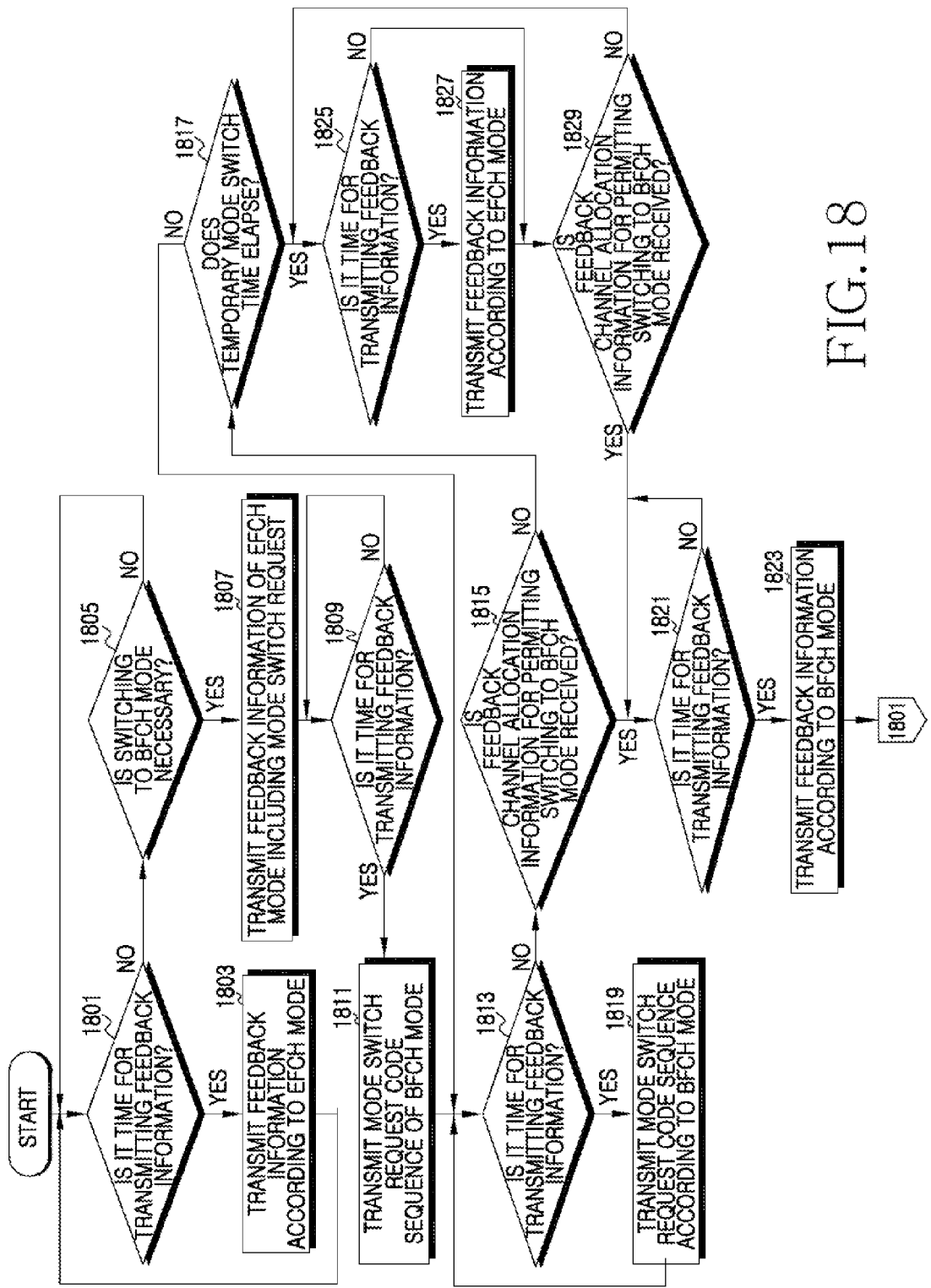
FIG. 18 is a flowchart illustrating an operation of an MS for switching to a temporary BFCH mode and for requesting switching to a BFCH mode from the temporary BFCH mode in a broadband wireless communication system according to an exemplary embodiment of the present invention.

FIG. 18 is a flowchart illustrating an operation of an MS for switching to a temporary BFCH mode and for requesting switching to a BFCH mode from the temporary BFCH mode in a broadband wireless communication system according to an exemplary embodiment of the present invention.

Referring to FIG. 18, the MS determines whether it is time for transmitting feedback information in step 1801. Since the MS periodically transmits the feedback information through a fast feedback channel allocated by a BS, the MS determines whether one period elapses after the feedback information is transmitted previously. The period is determined according to a mode of the feedback channel. The feedback channel currently operates in the EFCH mode.

If it is determined that it is time for transmitting the feedback information in step 1801, the MS transmits the feedback information according to the EFCH mode in step 1803. More specifically, the MS generates the feedback information, and generates complex symbols to be transmitted through an EFCH by coding and modulating the feedback information. Further, the MS transmits the complex symbols and pilot symbols through the feedback channel of the EFCH mode. Thereafter, the MS returns to step 1801.

If it is determined that it is not time for transmitting the feedback information in step 1801, the MS determines whether switching to the BFCH mode is necessary in step

1805. The switching to the BFCH mode is determined according to changes in a type of the feedback information. The type of the feedback information is determined according to a communication mode. For example, when intending to deactivate a MIMO mode while operating in the MIMO mode, the MS determines switching to the BFCH mode. If the switching to the BFCH mode is not necessary, the MS returns to step 1801.

In contrast, if it is determined that the switching to the BFCH mode is necessary in step 1805, the MS transmits feedback information including a mode switch request according to the EFCH mode in step 1807. That is, the MS transmits feedback information according to a transmission period by appending the mode switch request to the feedback information. For example, the mode switch request may be a 1-bit indicator as shown in the mode switch indication bit 420 of FIG. 4. That is, an indicator that indicates the mode switch request is included in feedback information transmitted according to the EFCH mode, and is set to an activated value if mode switching is requested and is set to an inactivated value if mode switching is not requested. However, feedback information transmitted according to the EFCH mode may have various formats, and in this case, feedback information of all formats may include the indicator or only feedback information of some formats may include the indicator.

In step 1809, the MS determines whether it is time for transmitting feedback information. Since the MS periodically transmits the feedback information through the fast feedback channel allocated by the BS, the MS determines whether one period elapses after previous feedback information is transmitted. The period is determined according to the mode of the feedback channel. Since the feedback information is transmitted at present according to the EFCH mode including the mode switch request, the feedback channel of the MS operates in the temporary BFCH mode.

If it is determined that it is time for transmitting the feedback information in step 1809, the MS transmits a mode switch request code sequence of the BFCH mode in step 1811. In other words, the MS selects a code sequence assigned for a mode switch request from a plurality of transmissible code sequences in the BFCH mode, converts the code sequence into complex symbols, and transmits the complex symbols through the feedback channel of the BFCH mode. For example, the mode switch request code sequence is either an E1 code dedicatedly allocated for switching from the BFCH mode to the EFCH mode or a code sequence indicating a preferred MIMO mode using the EFCH mode to be switched.

In step 1813, the MS determines whether it is time for transmitting feedback information. Since the MS periodically transmits the feedback information through the fast feedback channel allocated by the BS, the MS determines whether one period elapses after the feedback information is transmitted previously. The period is determined according to the mode of the feedback channel. Since the feedback information is transmitted according to the EFCH mode including the mode switch request, the feedback channel of the MS currently operates in the temporary BFCH mode.

If it is determined that it is not time for transmitting the feedback information in step 1813, the MS determines whether feedback channel allocation information for permitting switching to the BFCH mode is received from the BS in step 1815. The feedback channel allocation information includes information indicating a feedback channel location, a feedback period, a feedback mode, etc. In this case, the feedback channel allocation information includes information for allocating the feedback channel of the BFCH mode.

If it is determined that the feedback channel allocation information is not received in step 1815, the MS determines whether a temporary mode switch time elapses in step 1817. That is, after transmitting the feedback information including the mode switch request, the temporary mode switch time starts to elapse, and the MS determines whether the temporary mode switch time elapses. If the temporary mode switch time does not elapse, the MS returns to step 1813.

That is, by repeating steps 1813 to 1817, the MS determines whether the feedback information transmission time arrives, whether the feedback channel allocation information is received, or whether the temporary mode switch time elapses. If the feedback information transmission time arrives before the feedback channel allocation information is received or before the temporary mode switch time elapses in step 1813, the MS transmits feedback information according to the BFCH mode in step 1819. More specifically, the MS generates the feedback information, and selects a code sequence corresponding to the feedback information. Further, the MS converts the code sequence into complex symbols, and transmits the complex symbols through the feedback channel operating in the BFCH mode. Thereafter, the MS returns to step 1813.

In contrast, if the feedback channel allocation information for permitting switching to the BFCH mode is received before the temporary mode switch time elapses in step 1815, the MS determines whether it is time for transmitting feedback information in step 1821. Since the MS periodically transmits the feedback information through the fast feedback channel allocated by the BS, the MS determines whether one period elapses after the feedback information is transmitted previously. The period is determined according to the mode of the feedback channel. Since the feedback channel allocation information for permitting switching to the BFCH mode is received, the feedback channel of the MS currently operates in the BFCH mode.

Upon arrival of the time for transmitting the feedback information, the MS transmits the feedback information according to the BFCH mode in step 1823. More specifically, the MS generates the feedback information, and selects a code sequence corresponding to the feedback information. Further, the MS converts the code sequence into complex symbols, and transmits the complex symbols through the feedback channel operating in the BFCH mode. Thereafter, the MS returns to step 1801.

If the temporary mode switch time elapses before the feedback channel allocation information is received in step 1817, the MS determines whether it is time for transmitting feedback information in step 1825. Since the MS periodically transmits the feedback information through a fast feedback channel allocated by a BS, the MS determines whether one period elapses after the feedback information is transmitted previously. The period is determined according to a mode of the feedback channel. Since the temporary mode switch time elapses, the feedback channel of the MS currently operates in the EFCH mode.

If it is determined that it is time for transmitting the feedback information in step 1825, the MS transmits the feedback information according to the EFCH mode in step 1827. More specifically, the MS generates the feedback information, and generates complex symbols to be transmitted through an EFCH by coding and modulating the feedback information. Further, the MS transmits the complex symbols and pilot symbols through the feedback channel of the EFCH mode.

After transmitting the feedback information according to the EFCH mode, or if it is not time for transmitting the feedback information, the MS determines whether feedback channel allocation information for permitting switching to the BFCH mode is received from the BS in step 1829. The feedback channel allocation information includes information indicating a feedback channel location, a feedback period, a feedback mode, etc. In this case, the feedback channel allocation information includes information for allocating the feedback channel of the BFCH mode. If the feedback channel allocation information is received, returning to step 1821, the MS uses the feedback channel in the BFCH mode. Otherwise, if the feedback channel allocation information is not received, the MS returns to step 1825.

Figure 19:
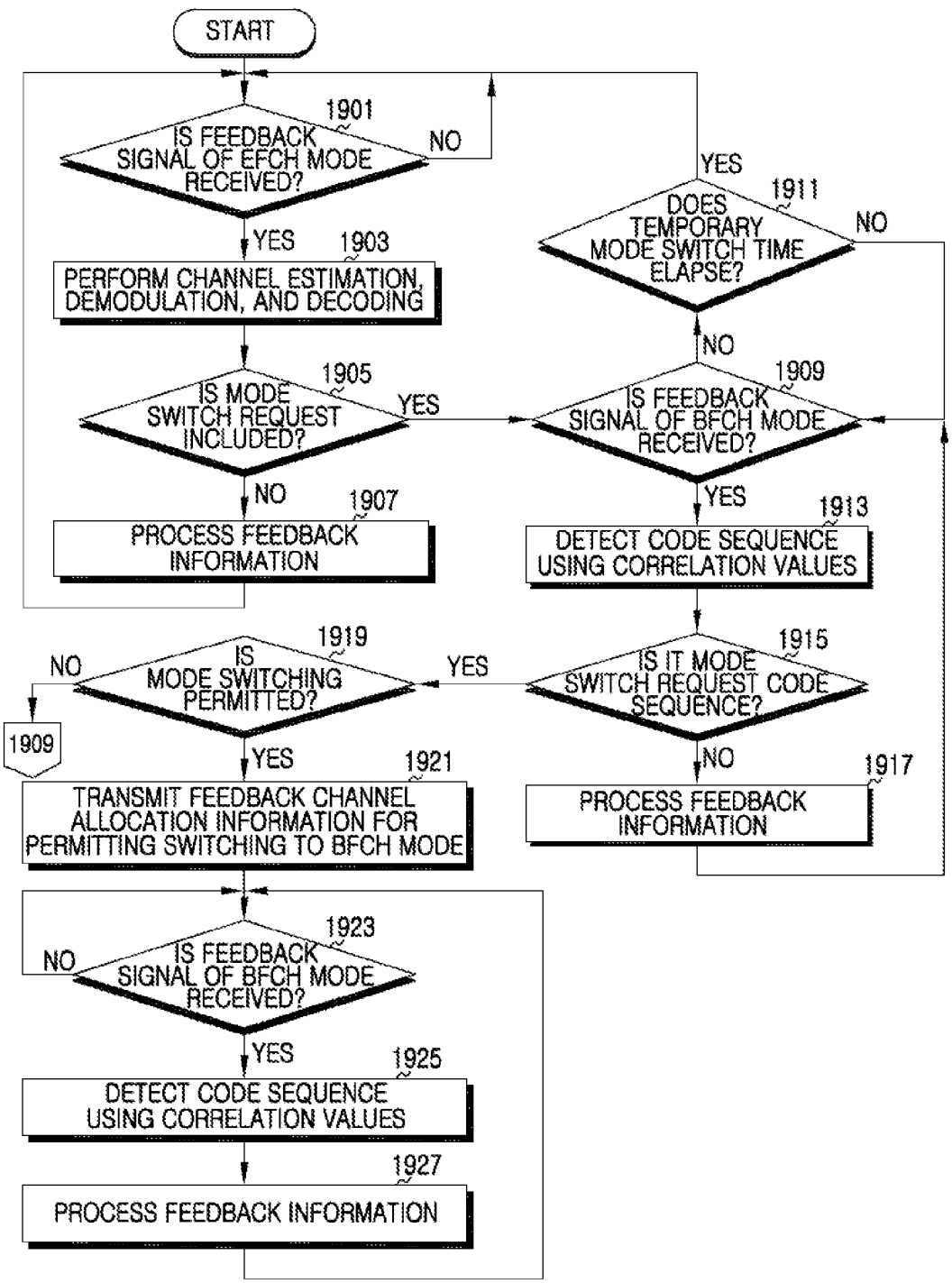
FIG. 19 is a flowchart illustrating an operation of a BS corresponding to an MS for switching to a temporary BFCH mode and for requesting switching to a BFCH mode from the temporary BFCH mode in a broadband wireless communication system according to an exemplary embodiment of the present invention.

FIG. 19 is a flowchart illustrating an operation of a BS corresponding to an MS for switching to a temporary BFCH mode and for requesting switching to a BFCH mode from the temporary BFCH mode in a broadband wireless communication system according to an exemplary embodiment of the present invention.

Referring to FIG. 19, the BS determines whether a feedback signal of the EFCH mode is received in step 1901. That is, the feedback channel of the MS currently operates in the EFCH mode, and the feedback signal is periodically received.

Upon receiving the feedback signal of the EFCH mode, the BS determines a feedback bit-stream by performing channel estimation, demodulation, and decoding in step 1903. That is, the BS detects a feedback bit-stream from a signal received through the fast feedback channel according to a coherent demodulation scheme. More specifically, the BS extracts pilot symbols from the signal received through the fast feedback channel, and then estimates a channel. Thereafter, the BS compensates for channel distortion of information symbols by using the estimated channel, and performs demodulation and decoding on the information symbols.

After detecting the feedback bit-stream, the BS determines whether a mode switch request is included in the feedback bit-stream in step 1905. The mode switch request is information for reporting a request for switching from the EFCH mode to the BFCH mode. For example, the mode switch request may be a 1-bit indicator as shown in the mode switch indication bit 420 of FIG. 4. That is, an indicator that indicates the mode switch request is included in feedback information transmitted according to the EFCH mode, and is set to an activated value if mode switching is requested and is set to an inactivated value if mode switching is not requested. However, feedback information transmitted according to the EFCH mode may have various formats, and in this case, feedback information of all formats may include the indicator or only feedback information of some formats may include the indicator.

In contrast, if it is determined that the mode switch request is not included in step 1905, the BS processes feedback information indicated by the detected bit-stream in step 1907. For example, the BS evaluates a CQI, a preferred sub-band, a PMI, a rank, etc., by using the feedback information. Thereafter, the BS returns to step 1901.

In contrast, if it is determined that the mode switch request is included in step 1905, the BS determines whether a feedback signal of the BFCH mode is received in step 1909. That is, the feedback channel of the MS currently operates in the temporary BFCH mode due to the mode switch request, and the feedback signal is periodically received.

If it is determined that the feedback signal of the BFCH mode is not received in step 1909, the BS determines whether a temporary mode switch time elapses in step 1911. That is, after transmitting the feedback information including the mode switch request, the temporary mode switch time starts to elapse, and the BS determines whether the temporary mode switch time elapses. If the temporary mode switch time does not elapse, the BS returns to step 1909. Otherwise, if the temporary mode switch time elapses, the BS returns to step 1901.

Upon receiving the feedback signal of the BFCH mode in step 1909, the BS detects a Tx code sequence by using correlation value between each of candidate code sequences and the received signal in step 1913. That is, the BS detects the Tx code sequence from the signal received through the fast feedback channel according to a noncoherent demodulation scheme. More specifically, the BS calculates correlation values between each of available code sequences and the received signal. For example, the BS calculates correlation values for each of a plurality of tiles and then performs a square operation on each correlation value. Further, the BS adds the squared correlation values calculated using the same candidate code sequence from the correlation values calculated from each tile, and then searches for a candidate code sequence corresponding to a maximum sum of the squared correlation values.

In step 1915, the BS determines whether the detected code sequence is a mode switch request code sequence. The mode switch request code sequence implies a code sequence assigned for a mode switch request from a plurality of transmissible code sequences in the BFCH mode. The mode switch request code sequence implies a code sequence for requesting switching from the EFCH mode to the BFCH mode. For example, the mode switch request code sequence is either an E2 code dedicatedly allocated for switching from the EFCH mode to the BFCH mode or a code sequence indicating a preferred MIMO mode using the BFCH mode.

If it is determined that the detected code sequence is not the mode switch request code sequence in step 1915, the BS evaluates a codeword corresponding to the detected code sequence and processes feedback information indicated by the codeword in step 1917. For example, the feedback information may be a CQI, an event trigger, etc.

In contrast, if it is determined that the detected code sequence is the mode switch request code sequence in step 1915, the BS determines whether mode switching of the feedback channel will be permitted in step 1919. Whether to permit the mode switching is determined by the number of unoccupied feedback channels, supportability of an operation of a corresponding mode, etc. If the mode switching of the feedback channel cannot be permitted, the BS returns to step 1909.

If it is determined that the mode switching of the feedback channel can be permitted in step 1919, the BS transmits feedback channel allocation information for permitting switching to the BFCH mode in step 1921. The feedback channel allocation information includes information indicating a feedback channel location, a feedback period, a feedback mode, etc. In this case, the feedback channel allocation information includes information for allocating the feedback channel of the BFCH mode.

In step 1923, the BS determines whether a feedback signal of the BFCH mode is received. That is, the feedback channel of the MS currently operates in the BFCH mode since the mode switching is permitted, and the feedback signal is periodically received.

Upon receiving the feedback signal of the BFCH mode, the BS detects a Tx code sequence by using correlation values between each of candidate code sequences and the received signal in step 1925. That is, the BS detects the Tx code sequence from the signal received through the fast feedback channel according to the noncoherent demodulation scheme. More specifically, the BS calculates correlation values between each of available code sequences and the received signal. For example, the BS calculates correlation values for each of a plurality of tiles and then performs a square operation on each correlation value. Further, the BS adds the squared correlation values calculated using the same candidate code sequence from the correlation values calculated from each tile, and then searches for a candidate code sequence corresponding to a maximum sum of the squared correlation values.

After detecting the code sequence, the BS evaluates a codeword corresponding to the detected code sequence, and processes feedback information indicated by the codeword in step 1927. For example, the feedback information may be a CQI, an event trigger, etc. Thereafter, the BS returns to step 1923.

Figure 20:
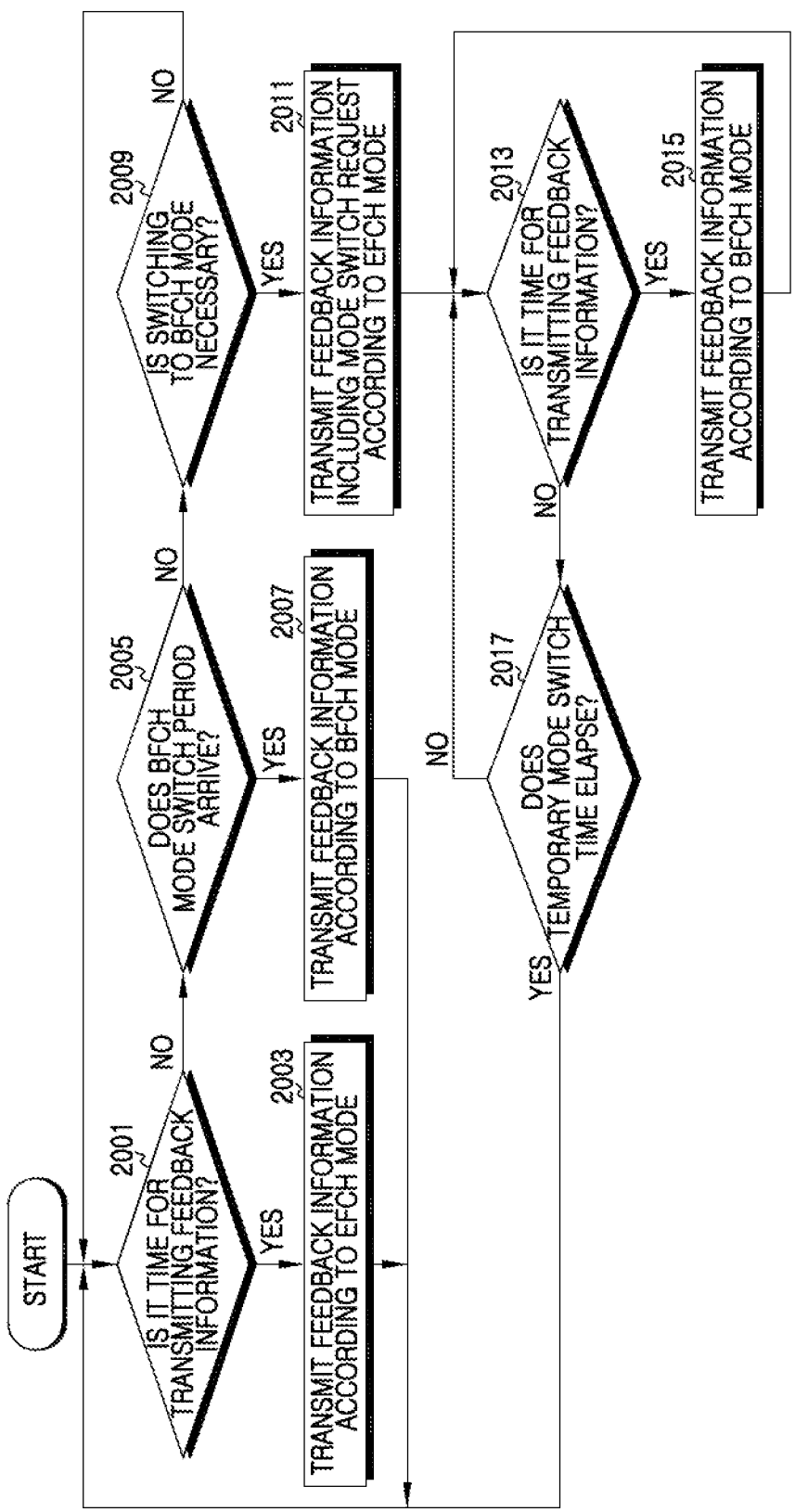
FIG. 20 is a flowchart illustrating an operation of an MS for requesting switching to a temporary BFCH mode while periodically switching to a BFCH mode in a broadband wireless communication system according to an exemplary embodiment of the present invention.

FIG. 20 is a flowchart illustrating an operation of an MS for requesting switching to a temporary BFCH mode while periodically switching to a BFCH mode in a broadband wireless communication system according to an exemplary embodiment of the present invention.

Referring to FIG. 20, the MS determines whether it is time for transmitting feedback information in step 2001. Since the MS periodically transmits the feedback information through a fast feedback channel allocated by a BS, the MS determines whether one period elapses after the feedback information is transmitted previously. The period is determined according to a mode of the feedback channel. The feedback channel currently operates in an EFCH mode.

If it is determined that it is time for transmitting the feedback information in step 2001, the MS transmits the feedback information according to the EFCH mode in step 2003. More specifically, the MS generates the feedback information, and generates complex symbols to be transmitted through an EFCH by coding and modulating the feedback information. Further, the MS transmits the complex symbols and pilot symbols through the feedback channel of the EFCH mode. Thereafter, the MS returns to step 2001.

If it is determined that it is not time for transmitting the feedback information in step 2001, the MS determines whether a BFCH mode switch period arrives in step 2005. That is, the MS switches to the BFCH mode according to a specific period. The BFCH mode switch period is determined by the number of frames or the number of feedback attempts.

Upon arrival of the BFCH mode switch period, the MS transmits feedback information according to the BFCH mode in step 2007. More specifically, the MS generates the feedback information, and selects a code sequence corresponding to the feedback information. Further, the MS converts the code sequence into complex symbols, and transmits the complex symbols through the feedback channel of the BFCH mode. Thereafter, the MS returns to step 2001.

If it is determined that the BFCH mode switch period does not arrive in step 2005, the MS determines whether switching to the BFCH mode is necessary in step 2009. The switching to the BFCH mode is determined according to changes in a type of the feedback information. The type of the feedback information is determined according to a communication mode. For example, when intending to deactivate a MIMO mode while operating in the MIMO mode, the MS determines switching to the BFCH mode. If the switching to the BFCH mode is not necessary, the MS returns to step 2001.

In contrast, if it is determined that the switching to the BFCH mode is necessary in step 2009, the MS transmits feedback information including a mode switch request according to the EFCH mode in step 2011. That is, the MS transmits feedback information according to a transmission period by appending the mode switch request to the feedback information. For example, the mode switch request may be a 1-bit indicator as shown in the mode switch indication bit 420 of FIG. 4. That is, an indicator that indicates the mode switch request is included in feedback information transmitted according to the EFCH mode, and is set to an activated value if mode switching is requested and is set to an inactivated value if mode switching is not requested. However, feedback information transmitted according to the EFCH mode may have various formats, and in this case, feedback information of all formats may include the indicator or only feedback information of some formats may include the indicator.

In step 2013, the MS determines whether it is time for transmitting feedback information. Since the MS periodically transmits the feedback information through the fast feedback channel allocated by the BS, the MS determines whether one period elapses after previous feedback information is transmitted. The period is determined according to the mode of the feedback channel. Since the feedback information is transmitted at present according to the EFCH mode including the mode switch request, the feedback channel of the MS currently operates in the temporary BFCH mode.

If it is determined that it is time for transmitting the feedback information in step 2013, the MS transmits the feedback information according to the BFCH mode in step 2015. More specifically, the MS generates the feedback information, and selects a code sequence corresponding to the feedback information. Further, the MS converts the code sequence into complex symbols, and transmits the complex symbols through the feedback channel operating in the BFCH mode. Thereafter, the MS returns to step 2013.

If it is determined that it is not time for transmitting the feedback information in step 2013, the MS determines whether a temporary mode switch time elapses in step 2017. That is, after transmitting the feedback information including the mode switch request, the temporary mode switch time starts to elapse, and the MS determines whether the temporary mode switch time elapses. If the temporary mode switch time does not elapse, the MS returns to step 2013. Otherwise, if the temporary mode switch time elapses, the MS returns to step 2001.

Figure 21:
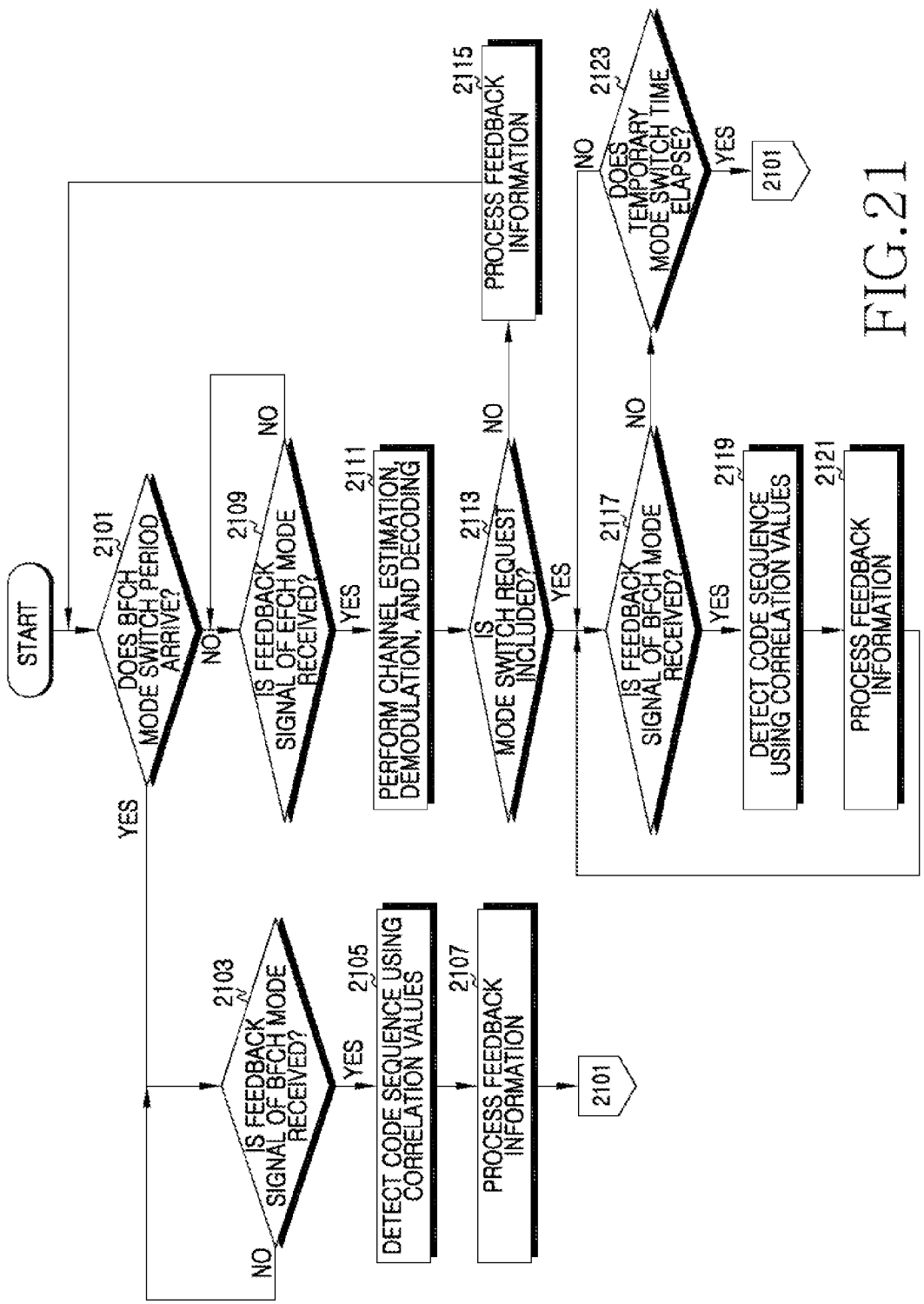
FIG. 21 is a flowchart illustrating an operation of a BS corresponding to an MS for requesting switching to a temporary BFCH mode while periodically switching to a BFCH mode in a broadband wireless communication system according to an exemplary embodiment of the present invention.

FIG. 21 is a flowchart illustrating an operation of a BS corresponding to an MS for requesting switching to a temporary BFCH mode while periodically switching to a BFCH mode in a broadband wireless communication system according to an exemplary embodiment of the present invention.

Referring to FIG. 21, the BS determines whether a BFCH mode switch period arrives in step 2101. That is, a mode of the feedback channel of the MS switches to the BFCH mode according to a specific period. The BFCH mode switch period is determined by the number of frames or the number of feedback attempts.

Upon arrival of the BFCH mode switch period in step 2101, the BS determines whether a feedback signal of the BFCH mode is received in step 2103. That is, the feedback channel of the MS currently operates in a periodic BFCH mode.

Upon receiving the feedback signal of the BFCH mode, the BS detects a Tx code sequence by using correlation values between each of candidate code sequences and the received signal in step 2105. That is, the BS detects the Tx code sequence from the signal received through the fast feedback channel according to a noncoherent demodulation scheme. More specifically, the BS calculates correlation values between each of available code sequences and the received signal. For example, the BS calculates correlation values for each of a plurality of tiles and then performs a square operation on each correlation value. Further, the BS adds the squared correlation values calculated using the same candidate code sequence from the correlation values calculated from each tile, and then searches for a candidate code sequence corresponding to a maximum sum of the squared correlation values.

In step 2107, the BS evaluates a codeword corresponding to the detected code sequence, and processes feedback information indicated by the codeword. For example, the feedback information may be a CQI, an event trigger, etc. Thereafter, the BS returns to step 2101.

If it is determined that the BFCH mode switch period does not arrive in step 2101, the BS determines whether a feedback signal of the EFCH mode is received in step 2109. That is, the feedback channel of the MS currently operates in the EFCH mode, and the feedback signal is periodically received.

Upon receiving the feedback signal of the EFCH mode, the BS determines a feedback bit-stream by performing channel estimation, demodulation, and decoding in step 2111. That is, the BS detects a feedback bit-stream from a signal received through the fast feedback channel according to a coherent demodulation scheme. More specifically, the BS extracts pilot symbols from the signal received through the fast feedback channel, and then estimates a channel. Thereafter, the BS compensates for channel distortion of information symbols by using the estimated channel, and performs demodulation and decoding on the information symbols.

After detecting the feedback bit-stream in step 2111, the BS determines whether a mode switch request is included in the feedback bit-stream in step 2113. The mode switch request is information for reporting a request for switching from the EFCH mode to the BFCH mode. For example, the mode switch request may be a 1-bit indicator as shown in the mode switch indication bit 420 of FIG. 4. That is, an indicator that indicates the mode switch request is included in feedback information transmitted according to the EFCH mode, and is set to an activated value if mode switching is requested and is set to an inactivated value if mode switching is not requested. However, feedback information transmitted according to the EFCH mode may have various formats, and in this case, feedback information of all formats may include the indicator or only feedback information of some formats may include the indicator.

In contrast, if it is determined that the mode switch request is not included in step 2113, the BS processes feedback information indicated by the detected bit-stream in step 2115. For example, the BS evaluates a CQI, a preferred sub-band, a PMI, a rank, etc., by using the feedback information. Thereafter, the BS returns to step 2101.

In contrast, if it is determined that the mode switch request is included in step 2113, the BS determines whether a feedback signal of the BFCH mode is received in step 2117. That is, the feedback channel of the MS operates in the temporary BFCH mode due to the mode switch request, and the feedback signal is periodically received.

Upon receiving the feedback signal of the BFCH mode, the BS detects a Tx code sequence by using correlation value between each of candidate code sequences and the received signal in step 2119. That is, the BS detects the Tx code sequence from the signal received through the fast feedback channel according to the noncoherent demodulation scheme. More specifically, the BS calculates correlation values between each of available code sequences and the received signal. For example, the BS calculates correlation values for each of a plurality of tiles and then performs a square operation on each correlation value. Further, the BS adds the squared correlation values calculated using the same candidate code sequence from the correlation values calculated from each tile, and then searches for a candidate code sequence corresponding to a maximum sum of the squared correlation values.

In step 2121, the BS evaluates a codeword corresponding to the detected code sequence, and processes feedback information indicated by the codeword. For example, the feedback information may be a CQI, an event trigger, etc.

If it is determined that the feedback signal of the BFCH mode is not received in step 2117, the BS determines whether a temporary mode switch time elapses in step 2123. That is, after transmitting the feedback information including the mode switch request, the temporary mode switch time starts to elapse, and the BS determines whether the temporary mode switch time elapses. If the temporary mode switch time does not elapse, the BS returns to step 2117. Otherwise, if the temporary mode switch time elapses, the BS returns to step 2101.

Figure 22A:
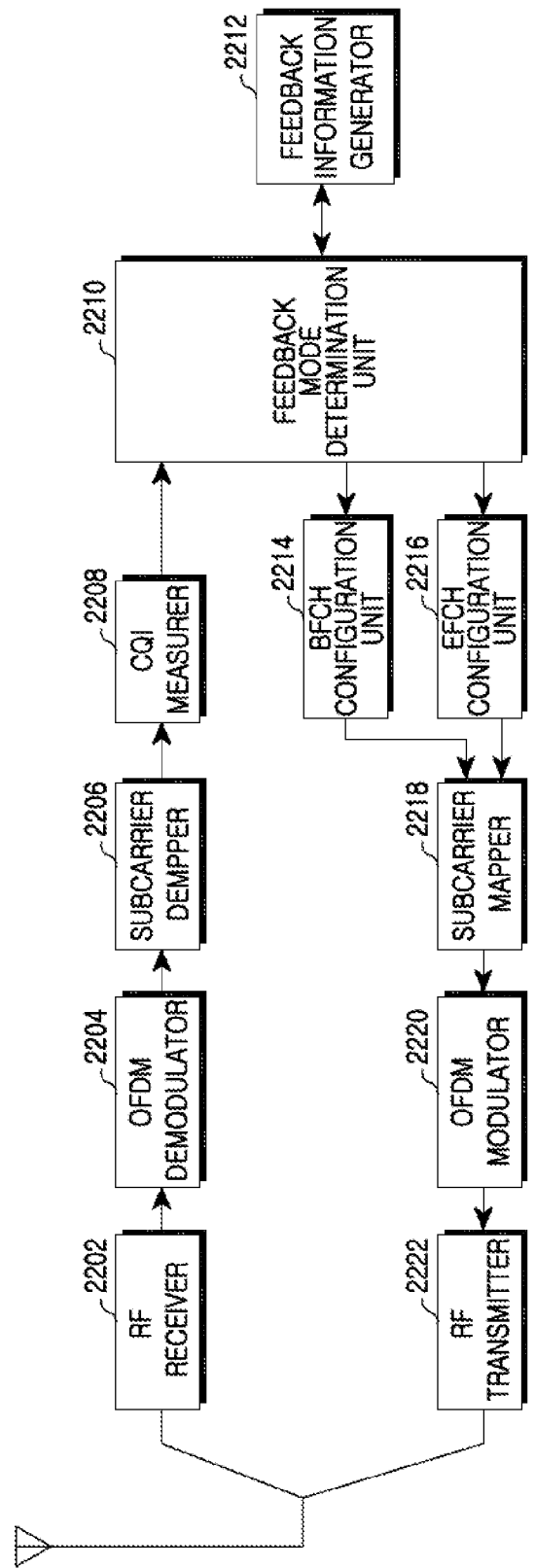
FIG. 22A to FIG. 22C are block diagrams illustrating a structure of an MS in a broadband wireless communication system according to an exemplary embodiment of the present invention.

FIG. 22A is a block diagram illustrating a structure of an MS in a broadband wireless communication system according to an exemplary embodiment of the present invention.

Referring to FIG. 22A, the MS includes a Radio Frequency (RF) receiver 2202, an OFDM demodulator 2204, a subcarrier dempper 2206, a CQI measurer 2208, a feedback mode determination unit 2210, a feedback information generator 2212, a BFCH configuration unit 2214, an EFCH configuration unit 2216, a subcarrier mapper 2218, an OFDM modulator 2220, and an RF transmitter 2222.

The RF receiver 2202 converts an RF signal received through an antenna into a base-band signal. The OFDM demodulator 2204 divides a signal provided from the RF receiver 2202 in an OFDM symbol unit, removes a Cyclic Prefix (CP), and restores complex symbols mapped to a frequency domain by performing a Fast Fourier Transform (FFT) operation. The subcarrier dempper 2206 extracts a signal used for channel quality estimation, such as a pilot signal, a preamble signal, etc., among the complex symbols mapped to the frequency domain. The CQI estimator 2208 estimates a downlink CQI by using a signal used for channel quality estimation such as the pilot signal, the preamble signal, etc.

The feedback mode determination unit 2210 determines a mode of a fast feedback mode according to channel quality estimated by the CQI estimator 2208. That is, if the CQI is less than a threshold, the feedback mode determination unit 2210 determines the mode of the fast feedback mode to a BFCH mode. Otherwise, if the CQI is greater than or equal to the threshold, the feedback mode determination unit 2210 determines the mode of the fast feedback mode to an EFCH mode. If the mode of the fast feedback channel is determined to the BFCH mode, the feedback mode determination unit 2210 controls the feedback information generator 2212 to generate feedback information including an item corresponding to the BFCH mode, and provides the BFCH configuration unit 2214 with feedback information provided from the feedback information generator 2212. Otherwise, if the mode of the fast feedback channel is determined to the EFCH mode, the feedback mode determination unit 2210 controls the feedback information generator 2212 to generate feedback information including an item corresponding to the EFCH mode, and provides the EFCH configuration unit 2216 with feedback information provided from the feedback information generator 2212.

In particular, the feedback mode determination unit 2210 evaluates a current mode of the fast feedback channel, and determines whether the current mode coincides with a mode corresponding to a format of the feedback information. If the current mode does not coincide with the mode corresponding to the format of the feedback information, the feedback mode determination unit 2210 controls the BFCH configuration unit 2214 or the EFCH configuration unit 2216 to transmit a signal for a mode switching request. For example, if switching from the BFCH mode to the EFCH mode is intended, the feedback mode determination unit 2210 controls the BFCH configuration unit 2214 to configure BFCH including a mode switching request code sequence for a request of switching to the EFCH mode. For example, the mode switch request code sequence is either an E1 code dedicatedly allocated for switching from the BFCH mode to the EFCH mode or a code sequence indicating a preferred MIMO mode using the EFCH mode to be switched. Otherwise, if switching from the EFCH mode to the BFCH mode is intended, the feedback mode determination unit 2210 controls the EFCH configuration unit 2216 to configure an EFCH including an activated mode switch indication bit for switching to the BFCH mode or controls the BFCH configuration unit 2214 to configure a BFCH including a mode switch request code sequence for a request of switching to the BFCH mode. For example, the mode switch request code sequence is either an E2 code dedicatedly allocated for switching from the EFCH mode to the BFCH mode or a code sequence indicating a preferred MIMO mode using the BFCH mode.

When the switching to the BFCH mode is requested, which one is transmitted between the BFCH including the mode switch request code sequence and the EFCH including the activated mode switch indication bit differs according to an exemplary embodiment of the present invention. That is, according to an exemplary embodiment of the present invention, either the BFCH including the mode switch request code sequence or the EFCH including the EFCH including the activate mode switch indication bit is selectively transmitted. On the other hand, according to another exemplary embodiment of the present invention, the EFCH including the activated mode switch indication bit is transmitted, and according to still another exemplary embodiment of the present invention, the EFCH including the mode switch request code sequence is transmitted.

The feedback information generator 2212 generates feedback information including items corresponding to the fast feedback channel's mode determined by the feedback mode determination unit 2210. For example, if the mode of the fast feedback channel is the BFCH mode, the feedback information generator 2212 generates feedback information indicating a CQI. Otherwise, if the mode of the fast feedback channel is the EFCH mode, the feedback information generator 2212 generates feedback information indicating a CQI, a preferred sub-band, a PMI, a rank, etc.

Figure 22B:
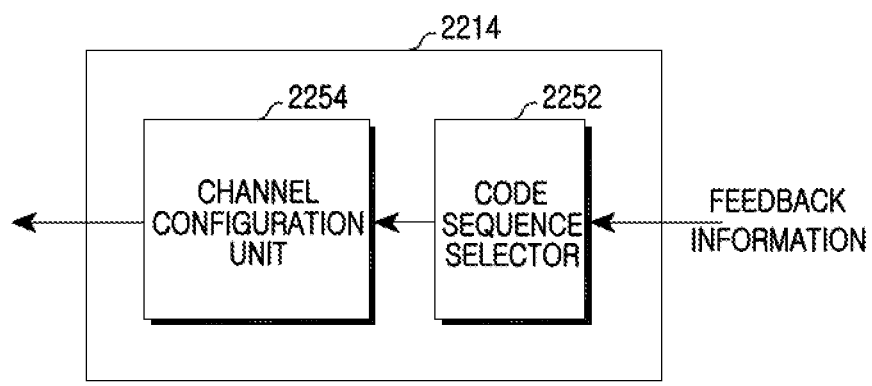

The BFCH configuration unit 2214 configures a BFCH by using the feedback information provided from the feedback mode determination unit 2210. That is, the BFCH configuration unit 2214 generates a feedback signal to be transmitted through the fast feedback channel according to a non-coherent modulation scheme. As shown in FIG. 22B, the BFCH configuration unit 2214 includes a code sequence selector 2252 and a channel configuration unit 2254. The code sequence selector 2252 selects a code sequence corresponding to the feedback information. In other words, the code sequence selector 2252 selects a payload corresponding to the feedback information, and then selects a code sequence corresponding to the payload among code sequences for the BFCH. In particular, if the feedback mode determination unit 2210 instructs to configure the BFCH including a mode switching request code sequence, the code sequence selector 2252 outputs the mode switching request code sequence. The channel configuration unit 2254 configures the BFCH by using the code sequence. That is, the channel configuration unit 2254 converts the code sequence into complex symbols, and configures the BFCH by assigning the complex symbols according to a structure of the BFCH.

Figure 22C:
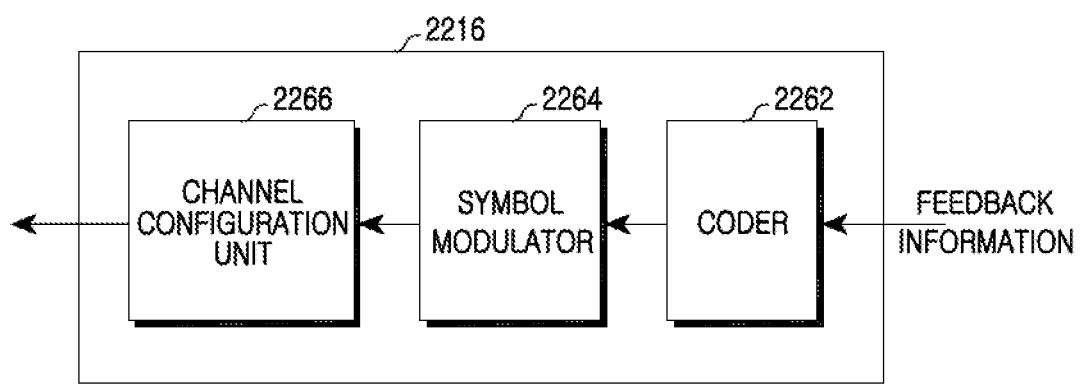

The EFCH configuration unit 2216 configures an EFCH by using the feedback information provided from the feedback mode determination unit 2210. That is, the EFCH configuration unit 2216 generates a feedback signal to be transmitted through the fast feedback channel according to a coherent modulation scheme. As shown in FIG. 22C, the EFCH configuration unit 2216 includes a coder 2262, a symbol modulator 2264, and a channel configuration unit 2266. The coder 2262 codes the feedback information. In this case, the coder 2262 sets a values of a mode switching indication bit under the instruction of the feedback mode determination unit 2210. That is, if the feedback mode determination unit 2210 instructs to configure the EFCH including an activated mode switching indication bit, the coder 2262 sets the mode switching indication bit to '1'. Further, the coder 2262 codes the feedback information bit-stream and the mode switching indication bit. The symbol modulator 2264 modulates the coded feedback information to generate complex symbols, i.e., information symbols, indicating feedback information to be transmitted through the EFCH. The channel configuration unit 2266 configures the EFCH by using the information symbols. That is, the channel configuration unit 2266 configures the EFCH by assigning the information symbols and the pilot symbols according to a structure of the EFCH.

The subcarrier mapper 2218 maps signals to be transmitted through the fast feedback channel and provided from the BFCH configuration unit 2214 or the EFCH configuration unit 2216 to resources allocated for the fast feedback channel. The OFDM modulator 2220 converts frequency-domain signals provided from the subcarrier mapper 2218 into time-domain signals by performing a Fast Fourier Transform (FFT) operation, and then configures OFDM symbols by inserting a CP. The RF transmitter 2222 up-converts the OFDM symbols provided from the OFDM modulator 2220 into RF signals, and then transmits the RF signals through an antenna.

A mode switching operation of a feedback channel will be described by using the structure of the MS described in FIG. 22A above according to an exemplary embodiment of the present invention.

The feedback mode determination unit 2210 controls a feedback signal generation operation of the BFCH configuration unit 2214 and the EFCH configuration unit 2216 according to a mode of the feedback channel.

If it is determined that the mode of the feedback channel is switched to the EFCH mode while the feedback channel operates in the BFCH mode, the feedback mode determination unit 2210 provides control such that a signal for mode switching of the feedback channel is transmitted through the feedback channel, and determines switching to the EFCH mode. For example, the signal for mode switching is a mode switch request code sequence transmitted according to the BFCH mode. For example, the mode switch request code sequence is either an E1 code dedicatedly allocated for switching from the BFCH mode to the EFCH mode or a code sequence indicating a preferred MIMO mode using the EFCH mode to be switched. According to an exemplary embodiment in which mode switching is achieved under the control of the BS, the feedback mode determination unit 2210 determines switching to the EFCH mode upon receiving feedback channel allocation information for permitting switching to the EFCH mode.

If it is determined that the mode of the feedback channel is switched to the BFCH mode while the feedback channel operates in the EFCH mode, the feedback mode determination unit 2210 provides control such that a signal for mode switching of the feedback channel is transmitted through the feedback channel, and determines switching to the BFCH mode. For example, the signal for requesting the mode switching is either a mode switch request code sequence transmitted according to the BFCH mode and feedback information including a mode switch request transmitted according to the EFCH mode. For example, the mode switch request code sequence is either an E2 code dedicatedly allocated for switching from the EFCH mode to the BFCH mode or a code sequence indicating a preferred MIMO mode using the BFCH mode. According to another exemplary embodiment of the present invention, the feedback mode determination unit 2210 determines temporary switching to the BFCH mode after transmitting the feedback information including the mode switch request. Accordingly, the feedback mode determination unit 2210 determines switching to the EFCH mode again when a specific duration elapses after mode switching is made to the BFCH mode. According to still another exemplary embodiment of the present invention, the feedback mode determination unit 2210 provides control to transmit a specific code sequence within a specific duration, wherein the specific code sequence is assigned for a request of switching from the EFCH mode to the BFCH mode and belongs to code sequences transmissible through the fast feedback channel of the BFCH mode, and determines switching to the BFCH mode upon receiving feedback channel allocation information for permitting switching to the BFCH mode. Additionally, the feedback mode determination unit 2210 can control the BFCH configuration unit 2214 to generate a feedback signal to be transmitted through the fast feedback channel of the BFCH mode according to a predefined period.

Figure 23A:
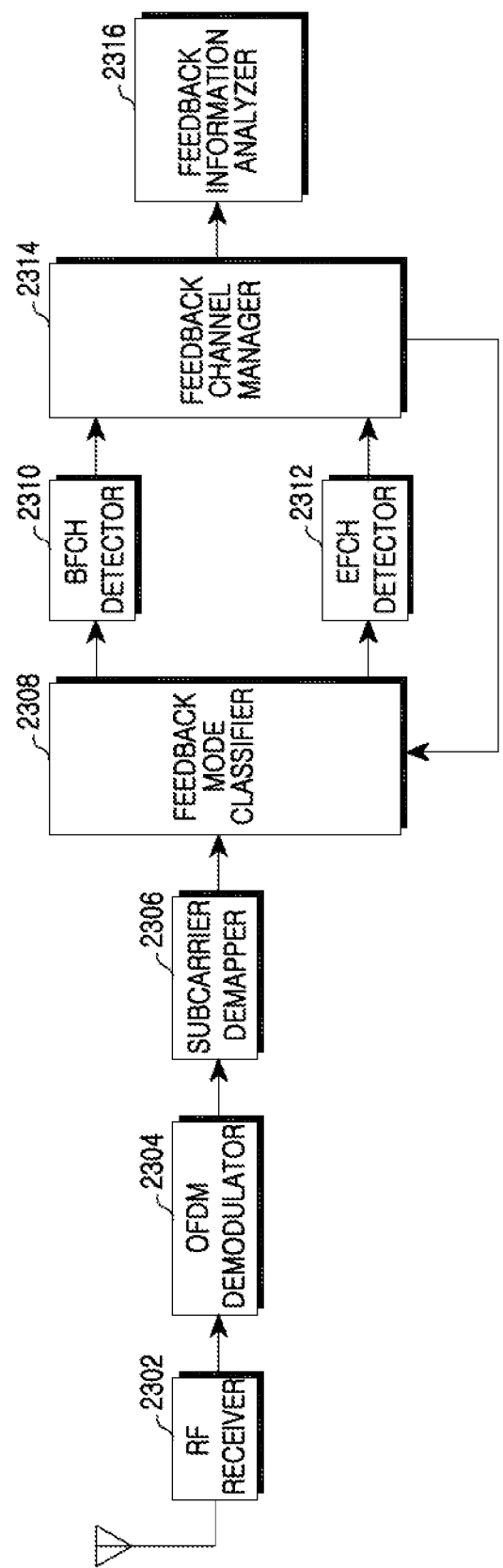
FIG. 23A to FIG. 23C are block diagrams illustrating a structure of a BS in a broadband wireless communication system according to an exemplary embodiment of the present invention.

FIG. 23A is a block diagram illustrating a structure of a BS in a broadband wireless communication system according to an exemplary embodiment of the present invention.

Referring to FIG. 23A, the BS includes an RF receiver 2302, an OFDM demodulator 2304, a subcarrier demapper 2306, a feedback mode classifier 2308, a BFCH detector 2310, an EFCH detector 2312, a feedback channel manager 2314, and a feedback information analyzer 2316.

The RF receiver 2302 converts an RF signal received through an antenna into a base-band signal. The OFDM demodulator 2304 divides a signal provided from the RF receiver 2302 in an OFDM symbol unit, removes a CP, and restores complex symbols mapped to a frequency domain by performing an FFT operation. The subcarrier dempper 2306 extracts a signal received through a fast feedback channel from the complex symbols mapped to the frequency domain.

The feedback mode classifier 2308 provides a signal received through the fast feedback channel according to a mode of the fast feedback channel to the BFCH detector 2310 and the EFCH detector 2312. If a plurality of fast feedback channels are respectively allocated to a plurality of MSs, the feedback mode classifier 2308 confirms the mode of the fast feedback channel, and provides a signal received through a fast feedback channel of each MS according to the confirmed mode to the BFCH detector 2310 or the EFCH detector 2312. That is, the plurality of MSs may have fast feedback channels of different modes.

Figure 23B:
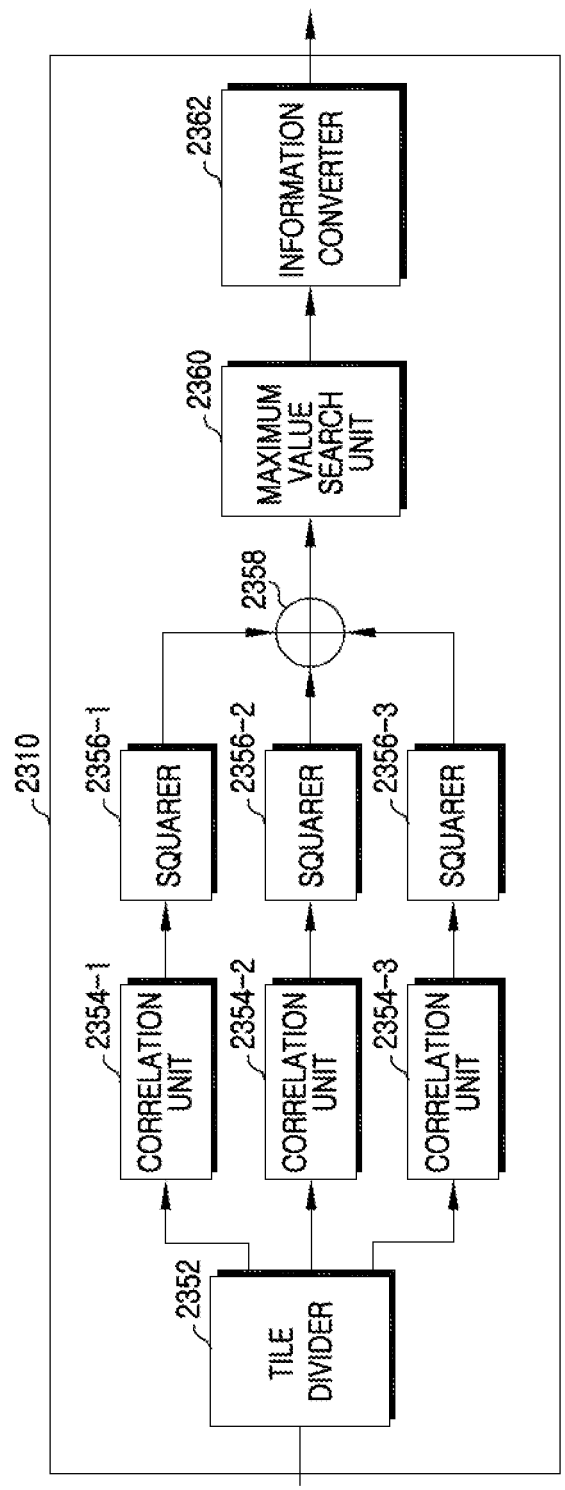

The BFCH detector 2310 detects a feedback bit-stream from the signal received through the fast feedback channel according to the BFCH mode. That is, the BFCH detector 2310 detects the feedback bit-stream from the signal received through the fast feedback channel according to a noncoherent demodulation scheme. In other words, the BFCH detector 2310 detects a Tx code sequence by using correlation values between each of candidate code sequences and the received signal. Referring to FIG. 23B, the BFCH detector 2310 includes a tile divider 2352, a plurality of correlation units 2354-1 to 2354-3, a plurality of squarers 2356-1 to 2356-3, an adder 2358, a maximum value search unit 2360, and an information converter 2362. The tile divider 2352 divides a signal received through a fast feedback channel and provided from the feedback mode classifier 2308 for each tile, and provides a signal for each tile to each of the correlation units 2354-1 to 2354-3. Each of the correlation units 2354-1 to 2354-3 performs a correlation operation on all candidate code sequences and a signal received through a tile managed by each correlation unit. Each of the squarers 2356-1 to 2356-3 squares correlation values provided from its corresponding correlation unit 2354. The number of the correlation units 2354-1 to 2354-3 and the number of the squarers 2356-1 to 2356-3 are substantially identical to the number of tiles constituting the fast feedback channel. The adder 2358 adds correlation values calculated from the same candidate code sequence among square correlation values provided from the squarers 2356-1 to 2356-3. That is, the adder 2358 calculates a sum of square correlation values corresponding to the respective candidate code sequences. The maximum value search unit 2360 searches for a maximum unit from the sums of square correlation values to detect a Tx code sequence. The information converter 2362 evaluates a payload corresponding to the detected code sequence, and provides the payload to the feedback channel manager 2314. In this case, if the detected code sequence is a mode switch request code sequence, the information converter 2362 informs the feedback channel manager 2314 of the fact that the mode switch request code sequence is detected. For example, the mode switch request code sequence is one of an E1 code dedicatedly assigned for switching from the BFCH mode to the EFCH mode, an E2 code dedicatedly assigned for switching from the EFCH mode to the BFCH mode, a code sequence indicating a preferred MIMO mode using the EFCH mode, and a code sequence indicating a preferred MIMO mode using the BFCH mode.

Figure 23C:
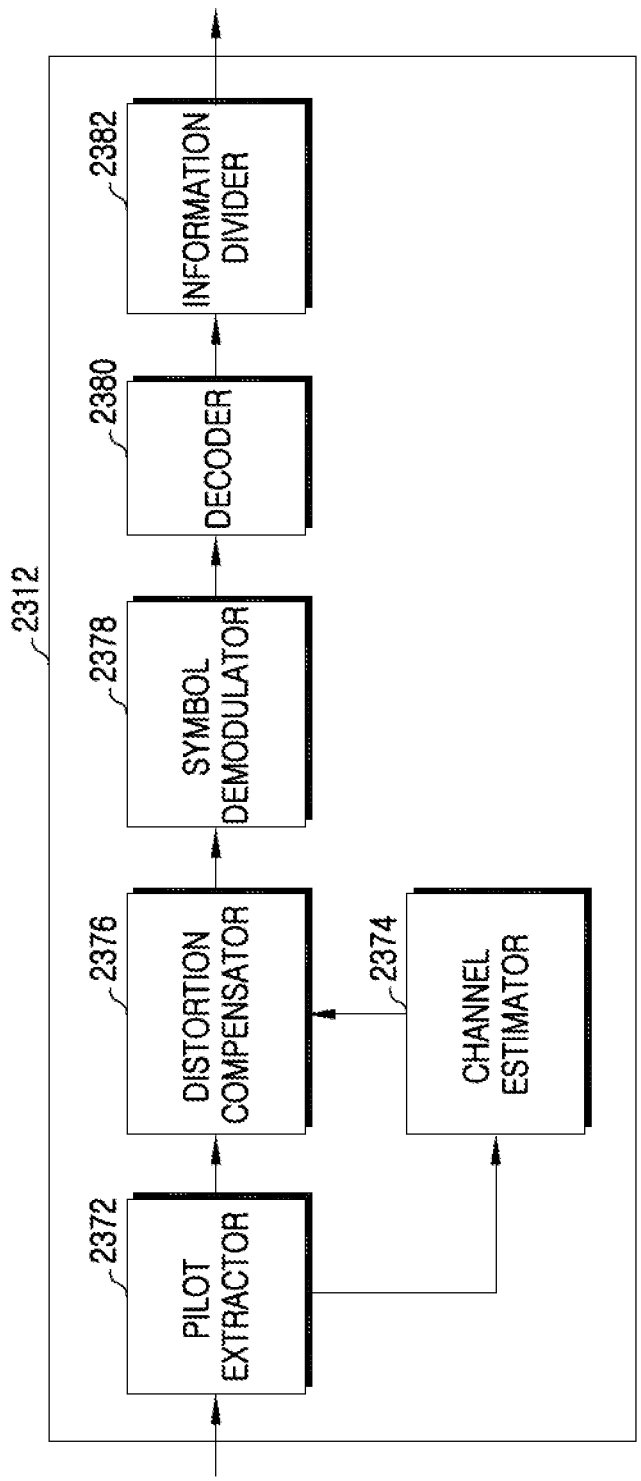

The EFCH detector 2312 detects a feedback bit-stream from the signal received through the fast feedback channel according to the EFCH mode. That is, the EFCH detector 2312 detects the feedback bit-stream from the signal received through the fast feedback channel according to a coherent demodulation scheme. In other words, the EFCH detector 2312 detects a feedback information bit-stream by performing channel estimation, demodulation, and decoding. Referring to FIG. 23C, the EFCH detector 2312 includes a pilot extractor 2372, a channel estimator 2374, a distortion compensator 2376, a symbol demodulator 2378, a decoder 2380, and an information divider 2382. The pilot extractor 2372 extracts pilot symbols from a signal received through the fast feedback channel, and then provides the pilot symbols to the channel estimator 2374 and provides information symbols to the distortion compensator 2376. The channel estimator 2374 estimates a channel of the fast feedback channel by using the pilot symbols. The distortion compensator 2376 compensates for channel distortion of the information symbols by using the channel estimated by the channel estimator 2374. The symbol demodulator 2378 demodulates the information symbols to convert them into a code bit-stream, and the decoder 2380 decodes the code bit-stream to restore a feedback bit-stream. The information divider 2382 divides the feedback bit-stream into an information bit-stream and a mode switch indication bit, and provides the information bit-stream to the feedback channel manager 2314. If the mode switch indication bit is activated, the information divider 2382 informs the feedback channel manager 2314 of the fact that the activated mode switch indication bit is detected. If an error occurs in the feedback bit-stream, the information divider 2382 informs the feedback channel manager 2314 of the error occurrence. The error occurrence is determined by reliability estimation on channel decoding, a CRC processing result, etc.

The feedback channel manager 2314 provides the feedback information analyzer 2316 with a payload provided from the BFCH detector 2310 and an information bit-stream provided from the EFCH detector 2312. Further, the feedback channel manager 2314 manages a mode of a fast feedback channel of each MS according to the notification provided by the BFCH detector 2310 to indicate whether the mode switch request code sequence is detected and according to the notification provided by the EFCH detector 2312 to indicate whether the activated mode switch indication bit is detected. That is, if a code sequence for requesting switching to the EFCH mode is detected by the BFCH detector 2310, the feedback channel manager 2314 determines to switch the fast feedback channel of a corresponding MS to the EFCH mode, and controls the feedback mode classifier 2308 to provide a signal received through the fast feedback channel of the MS to the EFCH detector 2312 in a next frame. Alternatively, if the mode switch request code sequence is detected by the BFCH detector 2310 or if the activated mode switch indication bit is detected by the EFCH detector 2312, the feedback channel manager 2314 determines to switch the fast feedback channel of the MS to the BFCH mode, and controls the feedback mode classifier 2308 to provide the BFCH detector 2310 with the signal received through the fast feedback channel of the MS in a next frame. If the EFCH detector 2312 recognizes that an error occurs in a feedback bit-stream, the feedback mode classifier 2308 controls the feedback mode classifier 2308 to provide the BFCH detector 2310 with the signal received through the fast feedback channel.

The feedback information analyzer 2316 analyzes feedback information provided from the feedback channel manager 2314. That is, the feedback information analyzer 2316 evaluates information such as a CQI, a preferred sub-band, PMI, a rank, etc., of the MS from the feedback information.

In the exemplary structure of the BS described above with reference to FIG. 23A and FIG. 23C, the BS attempts to detect the mode switch request code sequence for switching to the BFCH mode and also attempts to detect whether the mode switch indication bit is activated according to an exemplary embodiment of the present invention. According to another exemplary embodiment of the present invention, the BS does not attempt to detect the mode switch request code sequence for switching to the BFCH mode, thereby skipping an operation for controlling the feedback mode classifier 2308 to provide the signal received through the fast feedback channel to the BFCH detector 2310 if an error occurs in the feedback bit-stream. According to still another exemplary embodiment of the present invention, the BS does not attempt to detect whether the mode switch indication bit is activated, thereby skipping an operation of the EFCH detector 2312 for determining whether the mode switch indication bit is activated.

An operation corresponding to mode switching of a feedback channel of an MS will be described according to an exemplary embodiment of the present invention by using the structure of the BS described above with reference to FIG. 23A.

The feedback channel manager 2314 controls operations of the BFCH detector 2310 and the EFCH detector 2312 according to a mode of a feedback channel of an MS. That is, if the feedback channel operates in the BFCH mode, the feedback channel manager 2314 controls the BFCH detector 2310 to provide feedback information, and if the feedback channel operates in the EFCH mode, the feedback channel manager 2314 controls the EFCH detector 2312 to provide feedback information.

While the feedback channel operates in the BFCH mode, if a signal for requesting the mode switching from the BFCH mode to the EFCH mode is detected through the fast feedback channel, the feedback channel manager 2314 stops a detection operation of the BFCH detector 2310, and controls the EFCH detector 2312 to detect feedback information according to the EFCH mode. For example, the signal for requesting the mode switching is a mode switch request code sequence transmitted according to the EFCH mode, and the mode switch request code sequence is either an E1 code dedicatedly allocated for switching from the BFCH mode to the EFCH mode or a code sequence indicating a preferred MIMO mode using the EFCH mode to be switched. According to an exemplary embodiment in which mode switching is achieved under the control of the BS, the feedback channel manager 2314 operates the EFCH detector 2312 after determining whether switching to the EFCH mode is permitted and after transmitting feedback channel allocation information for permitting switching to the EFCH mode. That is, although not shown, the BS includes a message generator for generating the feedback channel allocation information and a transmitter for transmitting the feedback channel allocation information, and the feedback channel manager 2314 controls the message generator and the transmitter.

While the feedback channel operates in the EFCH mode, if a signal for requesting the mode switching from the EFCH mode to the BFCH mode is detected through the fast feedback channel, the feedback channel manager 2314 stops a detection operation of the EFCH detector 2312, and controls the BFCH detector 2310 to detect feedback information according to the BFCH mode. For example, the signal for requesting the mode switching is either a mode switch request code sequence transmitted according to the BFCH mode or feedback information including a mode switch request transmitted according to the EFCH mode. Herein, the mode switch request code sequence is either an E2 code dedicatedly allocated for switching from the EFCH mode to the BFCH mode or a code sequence indicating a preferred MIMO mode using the BFCH mode. According to another exemplary embodiment of the present invention, the feedback channel manager 2314 temporarily allows switching to the BFCH mode. If a specific duration elapses after the BFCH detector 2310 starts to detect feedback information according to the BFCH mode, the feedback channel manager 2314 stops a detection operation of the BFCH detector 2310, and controls the EFCH detector 2312 to detect feedback information according to the EFCH mode. According to still another exemplary embodiment of the present invention, upon receiving a specific code sequence within a specific duration, wherein the specific code sequence is assigned for a request of switching from the EFCH mode to the BFCH mode and belongs to code sequences transmissible through the fast feedback channel of the BFCH mode, the feedback channel manager 2314 controls the message generator and the transmitter so that feedback channel allocation information for permitting switching to the BFCH mode is transmitted after determining whether switching to the BFCH mode is permitted. Additionally, the feedback channel manager 2314 can control the BFCH detector 2310 to detect feedback information according to the BFCH mode from a feedback signal received through the fast feedback channel.

According to exemplary embodiments of the present invention, a mode of a fast feedback channel is switched depending on a type of feedback information in a broadband wireless communication system. Therefore, the fast feedback channel can be effectively operated with a limited amount of resources.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a mobile station in a wireless communication system, the method comprising:
    transmitting a feedback signal through a fast feedback channel in a first mode;
    transmitting a signal for requesting mode switching from the first mode to a second mode, through the fast feedback channel;
    receiving feedback channel allocation information indicating the second mode from a base station, the feedback channel allocation information comprising a feedback period and the second mode to be switched; and
    transmitting a feedback signal through the fast feedback channel in the second mode.

2. The method of claim 1,
    wherein the first mode comprises a mode where the mobile station transmits a code sequence through the fast feedback channel, and
    wherein the second mode comprises a mode where the mobile station transmits at least one pilot symbol and at least one feedback information symbol through the fast feedback channel.

3. The method of claim 2, wherein the transmitting of the signal for requesting the mode switching comprises transmitting a code sequence, which is assigned for a request of the mode switching, through the fast feedback channel in the first mode.

4. The method of claim 1,
    wherein the first mode comprises a mode where the mobile station transmits at least one pilot symbol and at least one feedback information symbol through the fast feedback channel, and
    wherein the second mode comprises a mode where the mobile station transmits a code sequence through the fast feedback channel.

5. The method of claim 4, wherein the transmitting of the signal for requesting the mode switching comprises transmitting a code sequence, which is assigned for a request of the mode switching, through the fast feedback channel in the second mode.

6. A method for operating a base station in a wireless communication system, the method comprising:
    receiving a feedback signal through a fast feedback channel in a first mode;
    receiving a signal for requesting mode switching through the fast feedback channel;
    transmitting feedback channel allocation information indicating the mode switching, the feedback channel allocation information comprising a feedback period and a mode to be switched; and
    receiving a feedback signal through the fast feedback channel in a second mode.

7. The method of claim 6,
    wherein the first mode comprises a mode where a mobile station transmits a code sequence through the fast feedback channel, and
    wherein the second mode comprises a mode where the mobile station transmits at least one pilot symbol and at least one feedback information symbol through the fast feedback channel.

8. The method of claim 7, wherein a signal for requesting the mode switching is a code sequence which is assigned for a request of the mode switching and the code sequence is detected in the first mode.

9. The method of claim 6,
    wherein the first mode comprises a mode where a mobile station transmits at least one pilot symbol and at least one feedback information symbol through the fast feedback channel, and
    wherein the second mode comprises a mode where the mobile station transmits a code sequence through the fast feedback channel.

10. The method of claim 9, wherein a signal for requesting the mode switching is a code sequence which is assigned for a request of the mode switching and the code sequence is detected in the second mode.

11. An apparatus for a mobile station in a wireless communication system, the apparatus comprising:
    a transmitter configured to:
        transmit a feedback signal through a fast feedback channel in a first mode, and
        transmit a signal for requesting mode switching from the first mode to a second mode through the fast feedback channel; and
    a receiver configured to receive feedback channel allocation information indicating the second mode from a base station, the feedback channel allocation information comprising a feedback period and the second mode to be switched, wherein the transmitter is further configured to transmit a feedback signal through the fast feedback channel in the second mode.

12. The apparatus of claim 11,
wherein the first mode comprises a mode where the mobile station transmits a code sequence through the fast feedback channel, and
wherein the second mode comprises a mode where the mobile station transmits at least one pilot symbol and at least one feedback information symbol through the fast feedback channel.

13. The apparatus of claim 12, wherein a signal for requesting the mode switching is a code sequence which is assigned for a request of the mode switching and the code sequence is transmitted in the first mode.

14. The apparatus of claim 11,
wherein the first mode comprises a mode where the mobile station transmits at least one pilot symbol and at least one feedback information symbol through the fast feedback channel, and
wherein the second mode comprises a mode where the mobile station transmits a code sequence through the fast feedback channel.

15. The apparatus of claim 14, wherein a signal for requesting the mode switching is a code sequence which is assigned for a request of the mode switching and the code sequence is transmitted in the first mode.

16. An apparatus for a base station in a wireless communication system, the apparatus comprising:
a receiver configured to:
receive a feedback signal through a fast feedback channel in a first mode, and
receive a signal for requesting mode switching through the fast feedback channel; and
a transmitter configured to transmit feedback channel allocation information indicating the mode switching, the feedback channel allocation information comprising a feedback period and a mode to be switched,
wherein the receiver is further configured to receive a feedback signal through the fast feedback channel in a second mode.

17. The apparatus of claim 16,
wherein the first mode comprises a mode where a mobile station transmits a code sequence through the fast feedback channel, and
wherein the second mode comprises a mode where the mobile station transmits at least one pilot symbol and at least one feedback information symbol through the fast feedback channel.

18. The apparatus of claim 17, wherein a signal for requesting the mode switching is a code sequence which is assigned for a request of the mode switching and the code sequence is detected in the first mode.

19. The apparatus of claim 16,
wherein the first mode comprises a mode where a mobile station transmits at least one pilot symbol and at least one feedback information symbol through the fast feedback channel, and
wherein the second mode comprises a mode where the mobile station transmits a code sequence through the fast feedback channel.

20. The apparatus of claim 19, wherein a signal for requesting the mode switching is a code sequence which is assigned for a request of the mode switching and the code sequence is detected in the second mode.

21. A method for operating a mobile station in a wireless communication system, the method comprising:

transmitting a first feedback signal through a fast feedback channel in a first mode;
transmitting a first signal for indicating a switch to a second mode through the fast feedback channel in the first mode;
transmitting a second signal for requesting mode switching from the first mode to the second mode through the fast feedback channel in the second mode; and
transmitting a second feedback signal through the fast feedback channel in the second mode.

22. The method of claim 21,
wherein the first mode comprises a mode where the mobile station transmits at least one pilot symbol and at least one feedback information symbol through the fast feedback channel, and
wherein the second mode comprises a mode where the mobile station transmits a code sequence through the fast feedback channel.

23. A method for operating a base station in a wireless communication system, the method comprising:
receiving a first feedback signal through a fast feedback channel in a first mode;
receiving a first signal for indicating a switch to a second mode through the fast feedback channel in the first mode;
receiving a second signal for requesting mode switching from the first mode to the second mode through the fast feedback channel in the second mode; and
receiving a second feedback signal through the fast feedback channel in the second mode.

24. The method of claim 23,
wherein the first mode comprises a mode where the mobile station transmits at least one pilot symbol and at least one feedback information symbol through the fast feedback channel, and
wherein the second mode comprises a mode where the mobile station transmits a code sequence through the fast feedback channel.

25. An apparatus for a mobile station in a wireless communication system, the apparatus comprising:
a transmitter configured to:
transmit a first feedback signal through a fast feedback channel in a first mode,
transmit a first signal for indicating a switch to a second mode through the fast feedback channel in the first mode,
transmit a second signal for requesting mode switching from the first mode to the second mode through the fast feedback channel in the second mode, and
transmit a second feedback signal through the fast feedback channel in the second mode.

26. The apparatus of claim 25,
wherein the first mode comprises a mode where the mobile station transmits at least one pilot symbol and at least one feedback information symbol through the fast feedback channel, and
wherein the second mode comprises a mode where the mobile station transmits a code sequence through the fast feedback channel.

27. An apparatus for a base station in a wireless communication system, the apparatus comprising:
a receiver configured to:
receive a first feedback signal through a fast feedback channel in a first mode,
receive a first signal for indicating a switch to a second mode through the fast feedback channel in the first mode, receive a second signal for requesting mode switching from the first mode to the second mode through the fast feedback channel in the second mode, and receive a second feedback signal through the fast feedback channel in the second mode.

28. The apparatus of claim 27, wherein the first mode comprises a mode where the mobile station transmits at least one pilot symbol and at least one feedback information symbol through the fast feedback channel, and wherein the second mode comprises a mode where the mobile station transmits a code sequence through the fast feedback channel.

\* \* \* \* \*